(12) United States Patent
Wang et al.

(10) Patent No.: US 7,965,866 B2
(45) Date of Patent: Jun. 21, 2011

(54) SYSTEM AND PROCESS FOR DETECTING, TRACKING AND COUNTING HUMAN OBJECTS OF INTEREST

(75) Inventors: Zhiqian Wang, Schaumburg, IL (US); William C. Kastilahn, Evanston, IL (US)

(73) Assignee: ShopperTrak RCT Corporation, Chicago, IL (US)

( * ) Notice: Subject to any disclaimer, the term of this patent is extended or adjusted under 35 U.S.C. 154(b) by 1021 days.

(21) Appl. No.: 11/773,254

(22) Filed: Jul. 3, 2007

(65) Prior Publication Data

US 2009/0010490 A1     Jan. 8, 2009

(51) Int. Cl.
*G06K 9/00* (2006.01)
(52) U.S. Cl. ........................................................ 382/103
(58) Field of Classification Search .................. 382/103, 382/106; 348/135, 143, 152, 169
See application file for complete search history.

(56) References Cited

U.S. PATENT DOCUMENTS

| | | | |
|---|---|---|---|
| 4,916,621 A | 4/1990 | Bean et al. | |
| 5,973,732 A | 10/1999 | Guthrie | |
| 6,445,810 B2 | 9/2002 | Darrell et al. | |
| 6,674,877 B1 * | 1/2004 | Jojic et al. | 382/103 |
| 6,697,104 B1 | 2/2004 | Yakobi et al. | |
| 6,771,818 B1 | 8/2004 | Krumm et al. | |
| 6,952,496 B2 | 10/2005 | Krumm | |
| 7,003,136 B1 | 2/2006 | Harville | |
| 7,092,566 B2 | 8/2006 | Krumm | |
| 7,161,482 B2 | 1/2007 | Rider et al. | |
| 7,176,441 B2 | 2/2007 | Sumitomo et al. | |
| 7,227,893 B1 * | 6/2007 | Srinivasa et al. | 375/240.08 |
| 7,400,744 B2 * | 7/2008 | Nichani et al. | 382/103 |

(Continued)

FOREIGN PATENT DOCUMENTS

WO    WO 2009/004479 A3    1/2009

OTHER PUBLICATIONS

Republication of WO 2009-004479 A3 with International Search Report, Jan. 8, 2009.

(Continued)

*Primary Examiner* — Matthew C Bella
*Assistant Examiner* — Shervin Nakhjavan
(74) *Attorney, Agent, or Firm* — Neal Gerber & Eisenberg LLP

(57)    ABSTRACT

A method of identifying, tracking, and counting human objects of interest based upon at least one pair of stereo image frames taken by at least one image capturing device, comprising the steps of: obtaining said stereo image frames and converting each said stereo image frame to a rectified image frame using calibration data obtained for said at least one image capturing device; generating a disparity map based upon a pair of said rectified image frames; generating a depth map based upon said disparity map and said calibration data; identifying the presence or absence of said objects of interest from said depth map and comparing each of said objects of interest to existing tracks comprising previously identified objects of interest; for each said presence of an object of interest, adding said object of interest to one of said existing tracks if said object of interest matches said one existing track, or creating a new track comprising said object of interest if said object of interest does not match any of said existing tracks; updating each said existing track; and maintaining a count of said objects of interest in a given time period based upon said existing tracks created or modified during said given time period.

41 Claims, 12 Drawing Sheets

U.S. PATENT DOCUMENTS

| | | | | |
|---|---|---|---|---|
| 2005/0249382 | A1* | 11/2005 | Schwab et al. | 382/115 |
| 2006/0088191 | A1* | 4/2006 | Zhang et al. | 382/107 |
| 2006/0210117 | A1* | 9/2006 | Chang et al. | 382/113 |
| 2008/0285802 | A1* | 11/2008 | Bramblet et al. | 382/103 |
| 2009/0195371 | A1* | 8/2009 | Camus | 340/435 |

OTHER PUBLICATIONS

Ismail Haritaoglu et al, W4: Who? When? Where? What? A Real Time System for Detecting and Tracking People, 3. International Conference on Face and Gesture Recognition, Apr. 14-16, 1998, Nara, Japan; pp. 1-6.

Michael Isard et al, Contour Tracking by Stochastic Propagation of Conditional Density, In Prc. European Conf. Computer Vision, 1996, pp. 343-356, Cambridge, UK.

Paolo Remagnino et al; Correlation Techniques in Adaptive Template Matching With Uncalibrated Cameras, Lifia—Inria Rhones-Alpes, Nov. 2, 1994.

Christopher Eveland et al, Background Modeling for Segmentation of Video-Rate Stereo Sequences, Jun. 23-25, 1998.

Christopher Richard Wren et al, Pfinder: Real-Time Tracking of the Human Body, IEEE Transacations on Pattern Analysis and Machine Intelligence, vol. 19, No. 7, Jul. 1997; pp. 780-785.

T, Darrell, et al Integrated person Tracking Using Stereo, Color, and Pattern Direction, pp. 1-8, Jun. 23-25, 1998.

International Search Report dated Feb. 12, 2009.

* cited by examiner

SYSTEM AND PROCESS FOR DETECTING, TRACKING AND COUNTING HUMAN OBJECTS OF INTEREST

BACKGROUND

1. Field of the Invention

The present invention generally relates to the field of object detection, tracking, and counting. In specific, the present invention is a computer-implemented detection and tracking system and process for detecting and tracking human objects of interest that appear in camera images taken, for example, at an entrance or entrances to a facility, as well as counting the number of human objects of interest entering or exiting the facility for a given time period.

2. Related Prior Art

Traditionally, various methods for detecting and counting the passing of an object have been proposed. U.S. Pat. No. 7,161,482 describes an integrated electronic article surveillance (EAS) and people counting system. The EAS component establishes an interrogatory zone by an antenna positioned adjacent to the interrogation zone at an exit point of a protected area. The people counting component includes one people detection device to detect the passage of people through an associated passageway and provide a people detection signal, and another people detection device placed at a predefined distance from the first device and configured to detect another people detection signal. The two signals are then processed into an output representative of a direction of travel in response to the signals.

Basically, there are two classes of systems employing video images for locating and tracking human objects of interest. One class uses monocular video streams or image sequences to extract, recognize, and track objects of interest [1] [2] [3] [4]. The other class makes use of two or more video sensors to derive range or height maps from multiple intensity images and uses the range or height maps as a major data source [5][6][7].

In monocular systems, objects of interest are detected and tracked by applying background differencing [1], or by adaptive template matching [4], or by contour tracking [2][3]. The major problem with approaches using background differencing is the presence of background clutters, which negatively affect robustness and reliability of the system performance. Another problem is that the background updating rate is hard to adjust in real applications. The problems with approaches using adaptive template matching are: (1) object detections tend to drift from true locations of the objects, or get fixed to strong features in the background; and (2) the detections are prone to occlusion. Approaches using the contour tracking suffer from difficulty in overcoming degradation by intensity gradients in the background near contours of the objects. In addition, all the previously mentioned methods are susceptible to changes in lighting conditions, shadows, and sunlight.

In stereo or multi-sensor systems, intensity images taken by sensors are converted to range or height maps, and the conversion is not affected by adverse factors such as lighting condition changes, strong shadow, or sunlight [5][6][7]. Therefore, performances of stereo systems are still very robust and reliable in the presence of adverse factors such as hostile lighting conditions. In addition, it is easier to use range or height information for segmenting, detecting, and tracking objects than to use intensity information.

Most state-of-the-art stereo systems use range background differencing to detect objects of interest. Range background differencing suffers from the same problems such as background clutter, as the monocular background differencing approaches, and presents difficulty in differentiating between multiple closely positioned objects.

U.S. Pat. No. 6,771,818 describes a system and process of identifying and locating people and objects of interest in a scene by selectively clustering blobs to generate "candidate blob clusters" within the scene and comparing the blob clusters to a model representing the people or objects of interest. The comparison of candidate blob clusters to the model identifies the blob clusters that is the closest match or matches to the model. Sequential live depth images may be captured and analyzed in real-time to provide for continuous identification and location of people or objects as a function of time.

U.S. Pat. Nos. 6,952,496 and 7,092,566 are directed to a system and process employing color images, color histograms, techniques for compensating variations, and a sum of match qualities approach to best identify each of a group of people and objects in the image of a scene. An image is segmented to extract regions which likely correspond to people and objects of interest and a histogram is computed for each of the extracted regions. The histogram is compared with pre-computed model histograms and is designated as corresponding to a person or object if the degree of similarity exceeds a prescribed threshold. The designated histogram can also be stored as an additional model histogram.

U.S. Pat. No. 7,176,441 describes a counting system for counting the number of persons passing a monitor line set in the width direction of a path. A laser is installed for irradiating the monitor line with a slit ray and an image capturing device is deployed for photographing an area including the monitor line. The number of passing persons is counted on the basis of one dimensional data generated from an image obtained from the photographing when the slit ray is interrupted on the monitor line when a person passes the monitor line.

Despite all the prior art in this field, no invention has developed a technology that enables unobtrusive detection and tracking of moving human objects, requiring low budget and maintenance while providing precise traffic counting results with the ability to distinguish between incoming and outgoing traffic, moving and static objects, and between objects of different heights. Thus, it is a primary objective of this invention to provide an unobtrusive traffic detection, tracking, and counting system that involves low cost, easy and low maintenance, high-speed processing, and capable of providing time-stamped results that can be further analyzed.

SUMMARY OF THE INVENTION

The present invention is directed to a system and process for detecting, tracking, and counting human objects of interest entering or exiting an entrance or entrances of a facility.

According to the present invention, the system includes: at least one image capturing device at the entrance to obtain images; a processor for extracting objects of interest from the images and generating tracks for each object of interest; and a counter for counting the number of objects of interest entering or exiting the entrance.

An objective of the present invention is to provide a technique capable of achieving a reasonable computation load and providing real-time detection, tracking, and counting results.

Another objective is to provide easy and unobtrusive tracking and monitoring of the facility.

Another objective of the present invention is to provide a technique to determine the ratio of the number of human objects entering the facility over the number of human objects of interest passing within a certain distance from the facility.

In accordance with these and other objectives that will become apparent hereafter, the present invention will be described with particular references to the accompanying drawings.

DETAILED DESCRIPTION OF THE INVENTION

This detailed description is presented in terms of programs, data structures or procedures executed on a computer or a network of computers. The software programs implemented by the system may be written in languages such as JAVA, C, C++, C#, Assembly language, Python, PHP, or HTML. However, one of skill in the art will appreciate that other languages may be used instead, or in combination with the foregoing.

1. System Components

Figure 1:
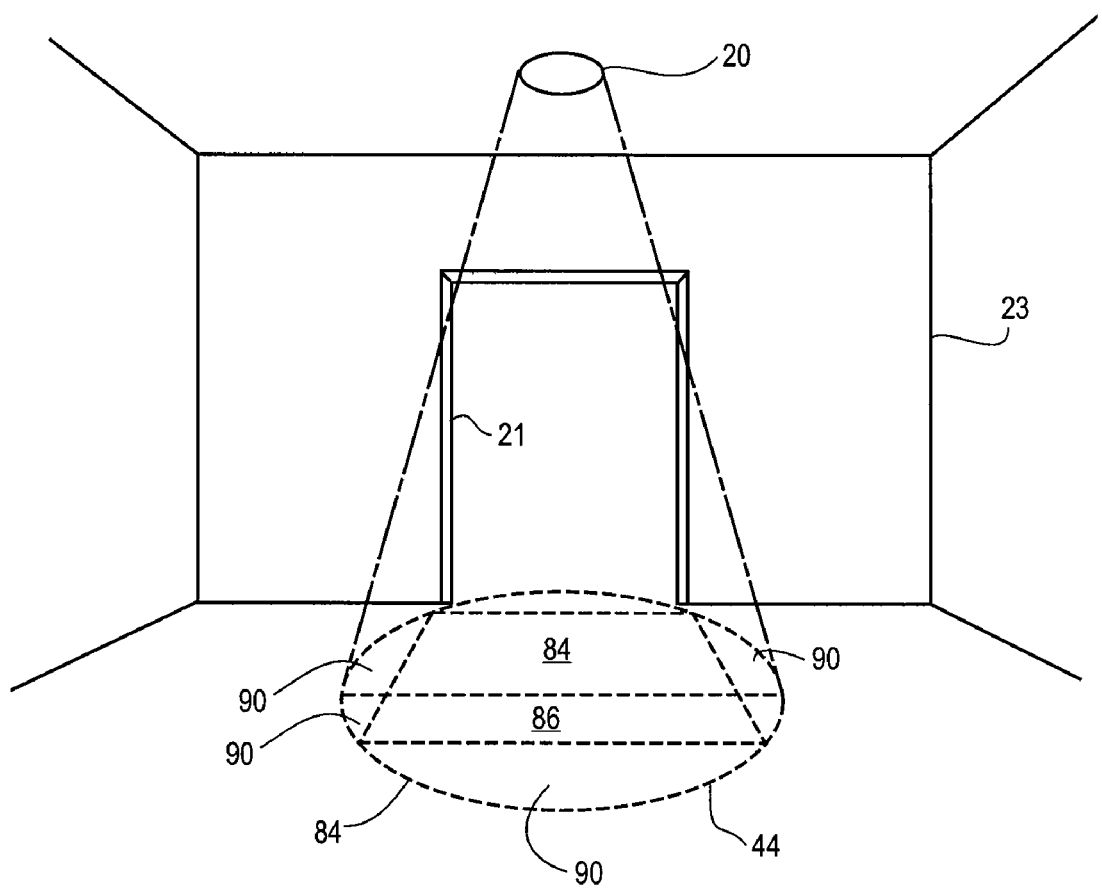
FIG. 1 is a schematic perspective view of a facility in which the system of the present invention is installed.
Figure 2:
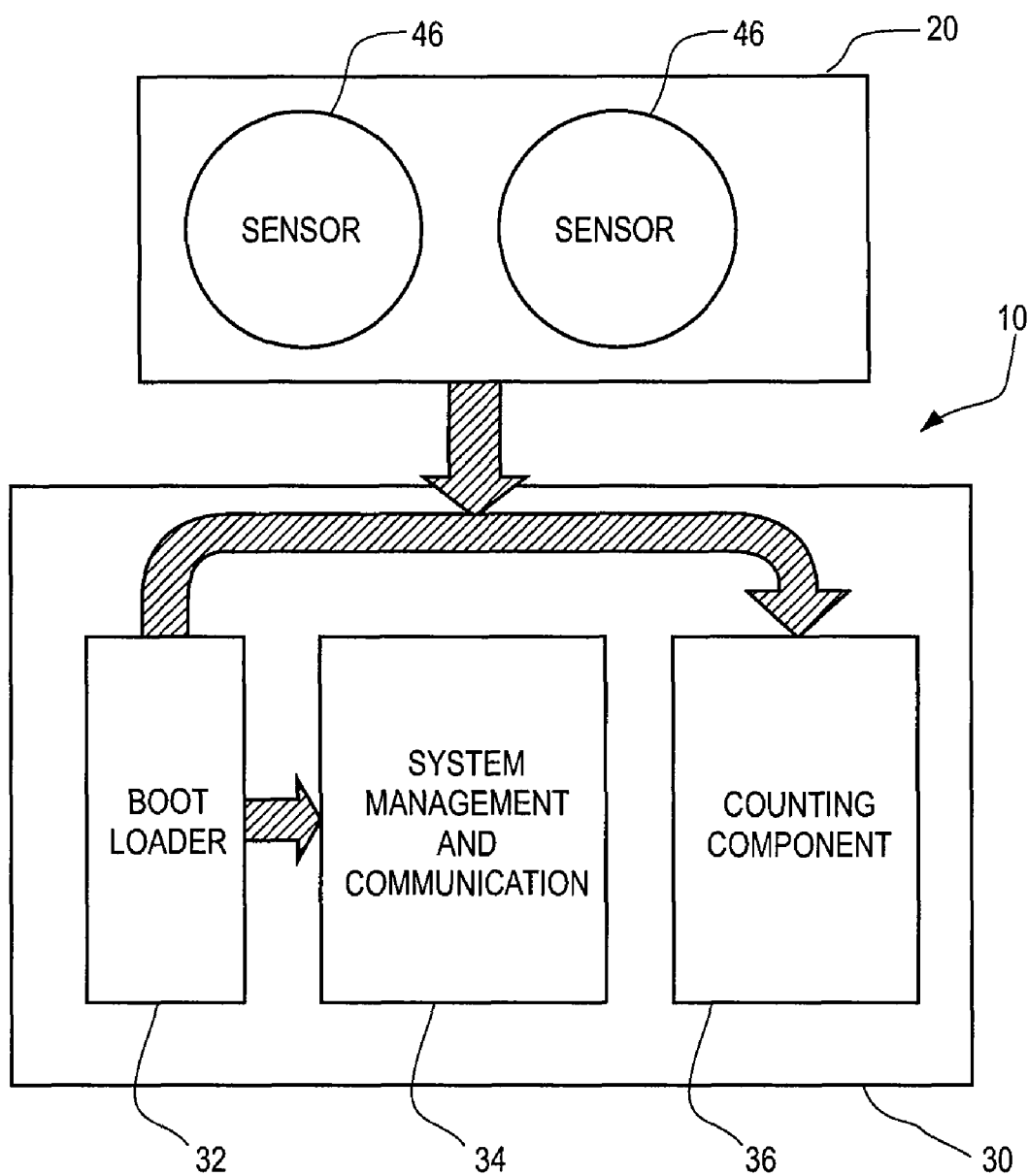
FIG. 2 is a diagram illustrating the image capturing device connected to an exemplary counting system of the present invention.
Figure 3:
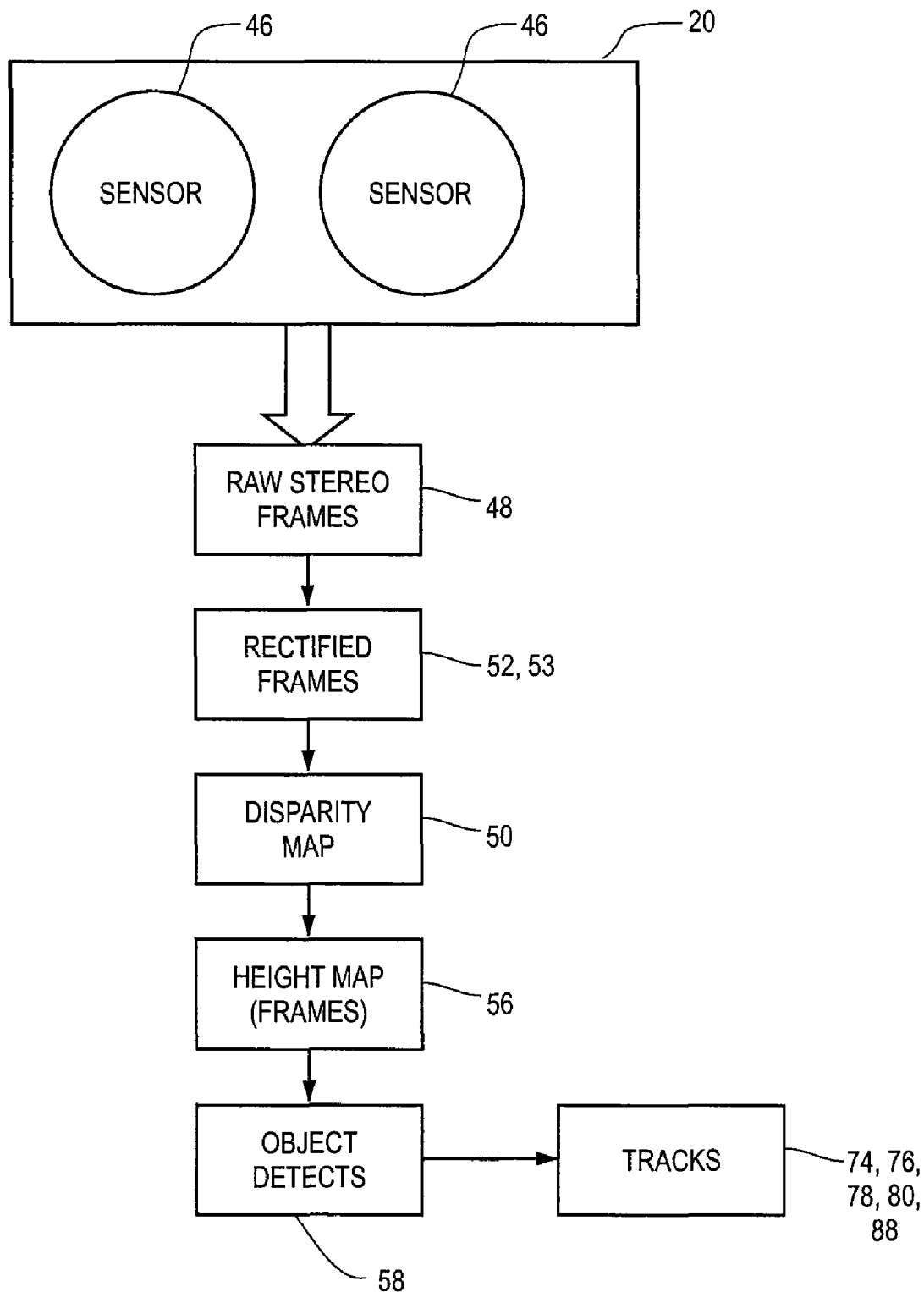
FIG. 3 is a diagram illustrating the sequence of converting one or more stereo image pairs captured by the system of the present invention into the height maps, which are analyzed to track and count human objects.

Referring to FIGS. 1, 2 and 3, the present invention is a system 10 comprising at least one image capturing device 20 electronically or wirelessly connected to a counting system 30. In the illustrated embodiment, the at least one image capturing device 20 is mounted above an entrance or entrances 21 to a facility 23 for capturing images from the entrance or entrances 21. Facilities such as malls or stores with wide entrances often require more than one image capturing device to completely cover the entrances. The area captured by the image capturing device 20 is field of view 44. Each image, along with the time when the image is captured, is a frame 48 (FIG. 3).

Typically, the image capturing device includes at least one stereo camera with two or more video sensors 46 (FIG. 2), which allows the camera to simulate human binocular vision. A pair of stereo images comprises frames 48 taken by each video sensor 46 of the camera. A height map 56 is then constructed from the pair of stereo images through computations involving finding corresponding pixels in rectified frames 52, 53 of the stereo image pair.

Door zone 84 is an area in the height map 56 marking the start position of an incoming track and end position of an outgoing track. Interior zone 86 is an area marking the end position of the incoming track and the start position of the outgoing track. Dead zone 90 is an area in the field of view 44 that is not processed by the counting system 30.

Video sensors 46 (FIG. 2) receive photons through lenses, and photons cause electrons in the image capturing device 20 to react and form light images. The image capturing device 20 then converts the light images to digital signals through which the device 20 obtains digital raw frames 48 (FIG. 3) comprising pixels. A pixel is a single point in a raw frame 48. The raw frame 48 generally comprises several hundred thousands or millions of pixels arranged in rows and columns.

Examples of video sensors 46 used in the present invention include CMOS (Complementary Metal-Oxide-Semiconductor) sensors and/or CCD (Charge-Coupled Device) sensors. However, the types of video sensors 46 should not be considered limiting, and any video sensor 46 compatible with the present system may be adopted.

The counting system 30 comprises three main components: (1) boot loader 32; (2) system management and communication component 34; and (3) counting component 36.

The boot loader 32 is executed when the system is powered up and loads the main application program into memory 38 for execution.

The system management and communication component 34 includes task schedulers, database interface, recording functions, and TCP/IP or PPP communication protocols. The database interface includes modules for pushing and storing data generated from the counting component 36 to a database at a remote site. The recording functions provide operations such as writing user defined events to a database, sending emails, and video recording.

The counting component 36 is a key component of the system 10 and is described in further detail as follows.

2. The Counting Component.

In an illustrated embodiment of the present invention, the at least one image capturing device 20 and the counting system 30 are integrated in a single image capturing and processing device. The single image capturing and processing device can be installed anywhere above the entrance or entrances to the facility 23. Data output from the single image capturing and processing device can be transmitted through the system management and communication component 34 to the database for storage and further analysis.

Figure 4:
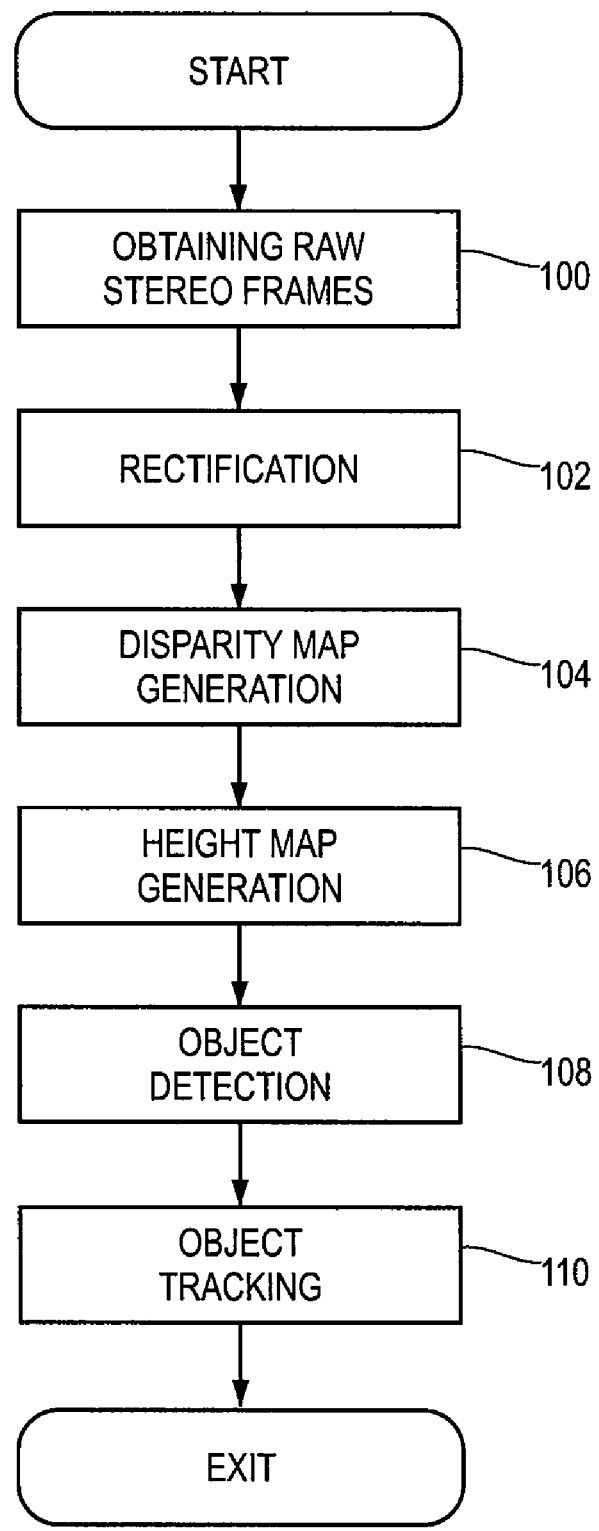
FIG. 4 is a flow diagram describing the flow of processes for a system performing human object detection, tracking, and counting according to the present invention.

FIG. 4 is a diagram showing the flow of processes of the counting component 36. The processes are: (1) obtaining raw frames (block 100); (2) rectification (block 102); (3) disparity map generation (block 104); (4) height map generation (block 106); (5) object detection (block 108); and (6) object tracking (block 110).

Referring to FIGS. 1-4, in block 100, the image capturing device 20 obtains raw image frames 48 (FIG. 3) at a given rate (such as for every 1/15 second) of the field of view 44 from the video sensors 46. Each pixel in the raw frame 48 records color and light intensity of a position in the field of view 44. When the image capturing device 20 takes a snapshot, each video sensor 46 of the device 20 produces a different raw frame 48 simultaneously. One or more pairs of raw frames 48 taken simultaneously are then used to generate the height maps 56 for the field of view 44, as will be described.

When multiple image capturing devices 20 are used, tracks 88 generated by each image capturing device 20 are merged before proceeding to block 102.

Block 102 uses calibration data of the stereo cameras (not shown) stored in the image capturing device 20 to rectify raw stereo frames 48. The rectification operation corrects lens distortion effects on the raw frames 48. The calibration data include each sensor's optical center, lens distortion information, focal lengths, and the relative pose of one sensor with respect to the other. After the rectification, straight lines in the real world that have been distorted to curved lines in the raw stereo frames 48 are corrected and restored to straight lines. The resulting frames from rectification are called rectified frames 52, 53 (FIG. 3).

Block 104 creates a disparity map 50 (FIG. 3) from each pair of rectified frames 52, 53. A disparity map 50 is an image map where each pixel comprises a disparity value. The term disparity was originally used to describe a 2-D vector between positions of corresponding features seen by the left and right eyes. Rectified frames 52, 53 in a pair are compared to each other for matching features. The disparity is computed as the difference between positions of the same feature in frame 52 and frame 53.

Block 106 converts the disparity map 50 to the height map 56. Each pixel of the height map 56 comprises a height value and x-y coordinates, where the height value is represented by the greatest ground height of all the points in the same location in the field of view 44. The height map 56 is sometimes referred to as a frame in the rest of the description.

2.1 Object Detection

Object detection (block 108) is a process of locating candidate objects 58 in the height map 56. One objective of the present invention is to detect human objects standing or walking in relatively flat areas. Because human objects of interest are much higher than the ground, local maxima of the height map 56 often represent heads of human objects or occasionally raised hands or other objects carried on the shoulders of human objects walking in counting zone 84, 86 (FIG. 1). Therefore, local maxima of the height map 56 are identified as positions of potential human object 58 detects. Each potential human object 58 detect is represented in the height map 56 by a local maximum with a height greater than a predefined threshold and all distances from other local maxima above a predefined range.

Occasionally, some human objects of interest do not appear as local maxima for reasons such as that the height map 56 is affected by false detection due to snow blindness effect in the process of generating the disparity map 50, or that human objects of interests are standing close to taller objects such as walls or doors. To overcome this problem, the current invention searches in the neighborhood of the most recent local maxima for a suboptimal location as candidate positions for human objects of interest, as will be described later.

A run is a contiguous set of pixels on the same row of the height map 56 with the same non-zero height values. Each run is represented by a four-tuple (row, start-column, end-column, height). In practice, height map 56 is often represented by a set of runs in order to boost processing performance and object detection is also performed on the runs instead of the pixels.

Object detection comprises four stages: 1) background reconstruction; 2) first pass component detection; 3) second pass object detection; and 4) merging of closely located detects.

2.1.1 Component Definition and Properties

Pixel q is an eight-neighbor of pixel p if q and p share an edge or a vertex in the height map 56, and both p and q have non-zero height values. A pixel can have as many as eight eight-neighbors.

A set of pixels E is an eight-connected component if for every pair of pixels $p_i$ and $p_j$ in E, there exists a sequence of pixels $p_i, \ldots, p_j$ such that all pixels in the sequence belong to the set E, and every pair of two adjacent pixels are eight-neighbors to each other. Without further noting, an eight-connected component is simply referred to as a connected component hereafter.

The connected component is a data structure representing a set of eight-connected pixels in the height map 56. A connected component may represent one or more human objects of interest. Properties of a connected component include height, position, size, etc. Table 1 provides a list of properties associated with a connected component. Each property has an abbreviated name enclosed in a pair of parentheses and a description. Properties will be referenced by their abbreviated names hereafter.

TABLE 1

| Number | Variable Name (abbreviated name) | Description |
|---|---|---|
| 1 | component ID (det_ID) | Identification of a component. In the first pass, componentID represents the component. In the second pass, componentID represents the parent component from which the current component is derived. |
| 2 | peak position (det_maxX, det_maxY) | Mass center of the pixels in the component having the greatest height value. |
| 3 | peak area (det_maxArea) | Number of pixels in the component having the greatest height value. |
| 4 | center (det_X, det_Y) | Mass center of all pixels of the component. |
| 5 | minimum size (det_minSize) | Size of the shortest side of two minimum rectangles that enclose the component at 0 and 45 degrees. |
| 6 | maximum size (det_maxSize) | Size of the longest side of two minimum rectangles that enclose the component at 0 and 45 degrees. |
| 7 | area (det_area) | Number of pixels of the component. |
| 8 | minimum height (det_minHeight) | Minimum height of all pixels of the component. |
| 9 | maximum height (det_maxHeight) | Maximum height of all pixels of the component. |
| 10 | height sum (det_htSum) | Sum of heights of pixels in a small square window centered at the center position of the component, the window having a configurable size. |

TABLE 1-continued

| Number | Variable Name (abbreviated name) | Description |
|---|---|---|
| 11 | Grouping flag (det_grouped) | A flag indicating whether the subcomponent still needs grouping. |
| 12 | background (det_inBackground) | A flag indicating whether the mass center of the component is in the background |
| 13 | the closest detection (det_closestDet) | Identifies a second pass component closest to the component but remaining separate after operation of "merging close detections". |

Several predicate operators are applied to a sunset of properties of the connected component to check if the subset of properties satisfies a certain condition. Component predicate operators include:

IsNoisy, which checks whether a connected component is too small to be considered a valid object detect 58. A connected component is considered as "noise" if at least two of the following three conditions hold: 1) its det_minSize is less than two thirds of a specified minimum human body size, which is configurable in the range of [9, 36] inches; 2) its det_area is less than four ninths of the area of a circle with its diameter equal to a specified minimum body size; and 3) the product of its det_minSize and det_area is less than product of the specified minimum human body size and a specified minimum body area.

IsPointAtBoundaries, which checks whether a square window centered at the current point with its side equal to a specified local maximum search window size is intersecting boundaries of the height map 56, or whether the connected component has more than a specific number of pixels in the dead zone 90. If this operation returns true, the point being checked is considered as within the boundaries of the height map 56.

NotSmallSubComponent, which checks if a subcomponent in the second pass component detection is not small. It returns true if its det_minSize is greater than a specified minimum human head size or its det_area is greater than a specified minimum human head area.

BigSubComponentSeed, which checks if a subcomponent seed in the second pass component detection is big enough to stop the grouping operation. It returns true if its det_minSize is greater than the specified maximum human head size or its det_area is greater than the specified maximum human head area.

SmallSubComponent, which checks if a subcomponent in the second pass component detection is small. It returns true if its det_minSize is less than the specified minimum human head size or its det_area is less than the specified minimum human head area.

2.1.2 Background Reconstruction

The background represents static scenery in the field view 44 of the image capturing device 20 and is constructed from the height map 56. The background building process monitors every pixel of every height map 56 and updates a background height map. A pixel may be considered as part of the static scenery if the pixel has the same non-zero height value for a specified percentage of time (e.g., 70%).

2.1.3 First-Pass Component Detection

First pass components are computed by applying a variant of an eight-connected image labeling algorithm on the runs of the height map 56. Properties of first pass components are calculated according to the definitions in Table 1. Predicate operators are also applied to the first pass components. Those first pass components whose "IsNoise" predicate operator returns "true" are ignored without being passed on to the second pass component detection phase of the object detection.

2.1.4 Second Pass Object Detection

In this phase, height map local maxima, to be considered as candidate human detects, are derived from the first pass components in the following steps.

First, for each first pass component, find all eight-connected subcomponents whose pixels have the same height. The det_grouped property of all subcomponents is cleared to prepare for subcomponent grouping and the det_ID property of each subcomponent is set to the ID of the corresponding first pass component.

Second, try to find the highest ungrouped local maximal subcomponent satisfying the following two conditions: (1) the subcomponent has the highest height among all of the ungrouped subcomponents of the given first pass component, or the largest area among all of the ungrouped subcomponents of the given first pass component if several ungrouped subcomponents with the same highest height exist; and (2) the subcomponent is higher than all of its neighboring subcomponents. If such a subcomponent exists, use it as the current seed and proceed to the next step for further subcomponent grouping. Otherwise, return to step 1 to process the next first pass component in line.

Third, if BigSubComponentSeed test returns true on the current seed, the subcomponent is then considered as a potential human object detect. Set the det_grouped flag of the subcomponent to mark it as grouped and proceed to step 2 to look for a new seed. If the test returns false, proceed to the next step.

Fourth, try to find a subcomponent next to the current seed that has the highest height and meets all of the following three conditions: (1) it is eight-connected to the current seed; (2) its height is smaller than that of the current seed; and (3) it is not connected to a third subcomponent that is higher and it passes the NotSmallSubComponent test. If more than one subcomponent meets all of above conditions, choose the one with the largest area. When no subcomponent meets the criteria, set the det_grouped property of the current seed to "grouped" and go to step 2. Otherwise, proceed to the next step.

Fifth, calculate the distance between centers of the current seed and the subcomponent found in the previous step. If the distance is less than the specified detection search range or the current seed passes the SmallSubComponent test, group the current seed and the subcomponent together and update the properties of the current seed accordingly. Otherwise, set the det_grouped property of the current seed as "grouped". Return to step 2 to continue the grouping process until no further grouping can be done.

2.1.5 Merging Closely Located Detections

Because the image capturing device 20 is mounted on the ceiling of the facility entrance (FIG. 1), a human object of interest is identified by a local maximum in the height map. Sometimes more than one local maxima detection is generated from the same human object of interest. For example, when a human object raises both of his hands at the same time, two closely located local maxima may be detected. Therefore, it is necessary to merge closely located local maxima.

The steps of this phase are as follows.

First, search for the closest pair of local maxima detections. If the distance between the two closest detections is greater than the specified detection merging distance, stop and exit the process. Otherwise, proceed to the next step.

Second, check and process the two detections according to the following conditions in the given order. Once one condition is met, ignore the remaining conditions and proceed to the next step:

a) if either but not all detection is in the background, ignore the one in the background since it is most likely a static object (the local maximum in the foreground has higher priority over the one in the background);

b) if either but not all detection is touching edges of the height map 56 or dead zones, delete the one that is touching edges of the height map 56 or dead zones (a complete local maximum has higher priority over an incomplete one);

c) if the difference between det_maxHeights of detections is smaller than a specified person height variation threshold, delete the detection with significantly less 3-D volume (e.g., the product of det_maxHeight and det_masArea for one connected component is less than two thirds of the product for the other connected component) (a strong local maximum has higher priority over a weak one);

d) if the difference between maximum heights of detections is more than one foot, delete the detection with smaller det_maxHeight if the detection with greater height among the two is less than the specified maximum person height, or delete the detection with greater det_maxHeight if the maximum height of that detection is greater than the specified maximum person height (a local maxima with a reasonable height has higher priority over a local maximum with an unlikely height);

e) delete the detection whose det_area is twice as small as the other (a small local maximum close to a large local maximum is more likely a pepper noise);

f) if the distance between the two detections is smaller than the specified detection search range, merge the two detections into one (both local maxima are equally good and close to each other);

g) keep both detections if the distance between the two detections is larger than or equal to the specified detection search range (both local maxima are equally good and not too close to each other). Update the det_closestDet attribute for each detection with the other detection's ID.

Then, return to step 1 to look for the next closest pair of detections.

The remaining local maxima detections after the above merging process are defined as candidate object detects 58, which are then matched with a set of existing tracks 74 for track extension, or new track initiation if no match is found.

2.2 Object Tracking

Object tracking (block 110 in FIG. 1) uses objects detected in the object detection process (block 108) to extend existing tracks 74 or create new tracks 80. Some short, broken tracks are also analyzed for possible track repair operations.

To count human objects using object tracks, zones 82 are delineated in the height map 56. Door zones 84 represent door areas around the facility 23 to the entrance. Interior zones 86 represent interior areas of the facility. A track 76 traversing from the door zone 84 to the interior zone 86 has a potential "in" count. A track 76 traversing to the door zone 84 from the interior zone 86 has a potential "out" count. If a track 76 traverses across zones 82 multiple times, there can be only one potential "in" or "out" count depending on the direction of the latest zone crossing.

Figure 5:
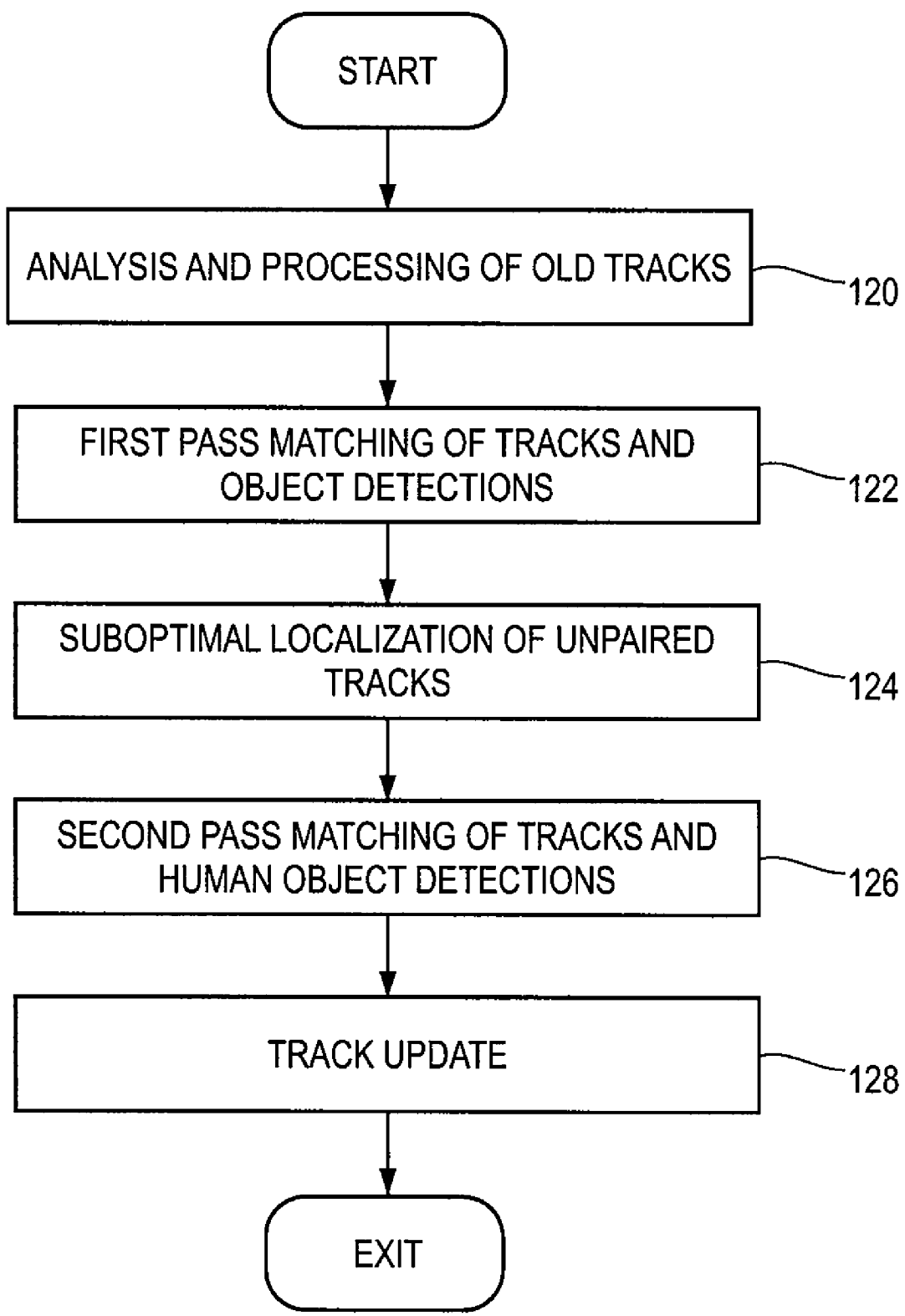
FIG. 5 is a flow diagram describing the flow of processes for object tracking.

As illustrated in FIG. 5, the process of object tracking 110 comprises the following phases: 1) analysis and processing of old tracks (block 120); 2) first pass matching between tracks and object detects (block 122); 3) suboptimal localization of unpaired tracks (block 124); 4) second pass matching between tracks and object detects (block 126); and 5) track updating or creation (block 128).

An object track 76 can be used to determine whether a human object is entering or leaving the facility, or to derive properties such as moving speed and direction for human objects being tracked.

Object tracks 76 can also be used to eliminate false human object detections, such as static signs around the entrance area. If an object detect 58 has not moved and its associated track 76 has been static for a relatively long time, the object detect 58 will be considered as part of the background and its track 76 will be processed differently than normal tracks (e.g., the counts created by the track will be ignored).

Object tracking 110 also makes use of color or gray level intensity information in the frames 52, 53 to search for best match between tracks 76 and object detects 58. Note that the color or the intensity information is not carried to disparity maps 50 or height maps 56.

The same technique used in the object tracking can also be used to determine how long a person stands in a checkout line.

2.2.1 Properties of Object Track

Each track 76 is a data structure generated from the same object being tracked in both temporal and spatial domains and contains a list of 4-tuples (x, y, t, h) in addition to a set of related properties, where h, x and y present the height and the position of the object in the field of view 44 at time t. (x, y, h) is defined in a world coordinate system with the plane formed by x and y parallel to the ground and the h axis vertical to the ground. Each track can only have one position at any time. In addition to the list of 4-tuples, track 76 also has a set of properties as defined in Table 2 and the properties will be referred to later by their abbreviated names in the parentheses:

TABLE 2

| Number | Variable Name | Description |
| --- | --- | --- |
| 1 | ID number (trk_ID) | A unique number identifying the track. |
| 2 | track state (trk_state) | A track could be in one of three states: active, inactive and deleted. Being active means the track is extended in a previous frame, being inactive means the track is not paired with a detect in a previous frame, and being deleted means the track is marked for deletion. |

TABLE 2-continued

| Number | Variable Name | Description |
|---|---|---|
| 3 | start point (trk_start) | The initial position of the track (Xs, Ys, Ts, Hs). |
| 4 | end point (trk_end) | The end position of the track (Xe, Ye, Te, He). |
| 5 | positive Step Numbers (trk_posNum) | Number of steps moving in the same direction as the previous step. |
| 6 | positive Distance (trk_posDist) | Total distance by positive steps. |
| 7 | negative Step Numbers (trk_negNum) | Number of steps moving in the opposite direction to the previous step. |
| 8 | negative Distance (trk_negDist) | Total distance by negative steps. |
| 9 | background count (trk_backgroundCount) | The accumulative duration of the track in background. |
| 10 | track range (trk_range) | The length of the diagonal of the minimal rectangle covering all of the track's points. |
| 11 | start zone (trk_startZone) | A zone number representing either door zone or interior zone when the track is created. |
| 12 | last zone (trk_lastZone) | A zone number representing the last zone the track was in. |
| 13 | enters (trk_enters) | Number of times the track goes from a door zone to an interior zone. |
| 14 | exits (trk_exits) | Number of times the track goes from an interior zone to a door zone. |
| 15 | total steps (trk_totalSteps) | The total non-stationary steps of the track. |
| 16 | high point steps (trk_highPtSteps) | The number of non-stationary steps that the track has above a maximum person height (e.g. 85 inches). |
| 17 | low point steps (trk_lowPtSteps) | The number of non-stationary steps below a specified minimum person height. |
| 18 | maximum track height (trk_maxTrackHt) | The maximum height of the track. |
| 19 | non-local maximum detection point (trk_nonMaxDetNum) | The accumulative duration of the time that the track has from non-local maximum point in the height map and that is closest to any active track. |
| 20 | moving vector (trk_movingVec) | The direction and offset from the closest point in time to the current point with the offset greater than the minimum body size. |
| 21 | following track (trk_followingTrack) | The ID of the track that is following closely. If there is a track following closely, the distance between these two tracks don't change a lot, and the maximum height of the front track is less than a specified height for shopping carts, then the track in the front may be considered as made by a shopping cart. |
| 22 | minimum following distance (trk_minFollowingDist) | The minimum distance from this track to the following track at a point of time. |
| 23 | maximum following distance (trk_maxFollowingDist) | The maximum distance from this track to the following track at a point of time. |
| 24 | following duration (trk_voteFollowing) | The time in frames that the track is followed by the track specified in trk_followingTrack. |
| 25 | most recent track (trk_lastCollidingTrack) | The id of a track whose detection t was once very close to this track's non-local minimum candidate extending position. |
| 26 | number of merged tracks (trk_mergedTracks) | The number of small tracks that this track is made of through connection of broken tracks. |
| 27 | number of small track searches (trk_smallSearches) | The number of small track search ranges used in merging tracks. |
| 28 | Mirror track (trk_mirrorTrack) | The ID of the track that is very close to this track and that might be the cause of this track. This track itself has to be from a non-local maximum detection created by a blind search, or its height has to be less than or equal to the specified minimum person height in order to be qualified as a candidate for false tracks. |
| 29 | Mirror track duration (trk_voteMirrorTrack) | The time in frames that the track is a candidate for false tracks and is closely accompanied by the track specified in trk_mirrorTrack within a distance of the specified maximum person width. |
| 30 | Maximum mirror track distance (trk_maxMirrorDist) | The maximum distance between the track and the track specified in trk_mirrorTrack. |

2.2.2 Track-Related Predicative Operations

Several predicate operators are defined in order to obtain the current status of the tracks 76. The predicate operators are applied to a subset of properties of a track 76 to check if the subset of properties satisfies a certain condition. The predicate operators include:

IsNoisyNow, which checks if a track bouncing back and forth locally at the current time. Specifically, a track 76 is considered noisy if the track points with a fixed number of frames in the past (specified as noisy track duration) satisfies one of the following conditions:
- (a) the range of track 76 (trk_range) is less than the specified noisy track range, and either the negative distance (trk_negDist) is larger than two thirds of the positive distance (trk_posDist) or the negative steps (trk_negNum) are more than two thirds of the positive steps (trk_posNum);
- (b) the range of track 76 (trk_range) is less than half of the specified noisy track range, and either the negative distance (trk_negDist) is larger than one third of the positive distance (trk_posDist) or the negative steps (trk_negNum) are more than one third of the positive steps (trk_posNum).

WholeTrackIsNoisy: a track 76 may be noisy at one time and not noisy at another time. This check is used when the track 76 was created a short time ago, and the whole track 76 is considered noisy if one of the following conditions holds:
- (a) the range of track 76 (trk_range) is less than the specified noisy track range, and either the negative distance (trk_negDist) is larger than two thirds of the positive distance (trk_posDist) or the negative steps (trk_negNum) are more than two thirds of the positive steps (trk_posNum);
- (b) the range of track 76 (trk_range) is less than half the specified noisy track range, and either the negative distance trk_negDist) is larger than one third of the positive distance (trk_posDist) or the negative steps (trk_negNum) are more than one third of the positive steps (trk_posNum).

IsSameTrack, which check if two tracks 76, 77 are likely caused by the same human object. All of the following three conditions have to be met for this test to return true: (a) the two tracks 76, 77 overlap in time for a minimum number of frames specified as the maximum track timeout; (b) the ranges of both tracks 76, 77 are above a threshold specified as the valid counting track span; and (c) the distance between the two tracks 76, 77 at any moment must be less than the specified minimum person width.

IsCountIgnored: when the track 76 crosses the counting zones, it may not be created by a human object of interest. The counts of a track are ignored if one of the following conditions is met:

Invalid Tracks: the absolute difference between trk_exits and trk_enters is not equal to one.

Small Tracks: trk_range is less than the specified minimum counting track length.

Unreliable Merged Tracks: trk_range is less than the specified minimum background counting track length as well as one of the following: trk_mergedTracks is equal to trk_smallSearches, or trk_backgroundCount is more than 80% of the life time of the track 76, or the track 76 crosses the zone boundaries more than once.

High Object Test: trk_highPtSteps is larger than half of trk_totalSteps.

Small Child Test: trk_lowPtSteps is greater than ¾ of trk_totalSteps, and trk_maxTrackHt is less than or equal to the specified minimum person height.

Shopping Cart Test: trk_voteFollowing is greater than 3, trk_minFollowingDist is more than or equal to 80% of trk_maxFollowingDist, and trk_maxTrackHt is less than or equal to the specified shopping cart height.

False Track test: trk_voteMirrorTrack is more than 60% of the life time of the track 76, and trk_maxMirrorTrackDist is less than two thirds of the specified maximum person width or trk_totalVoteMirrorTrack is more than 80% of the life time of the track 76.

2.2.3 Track Updating Operation

Figure 12:
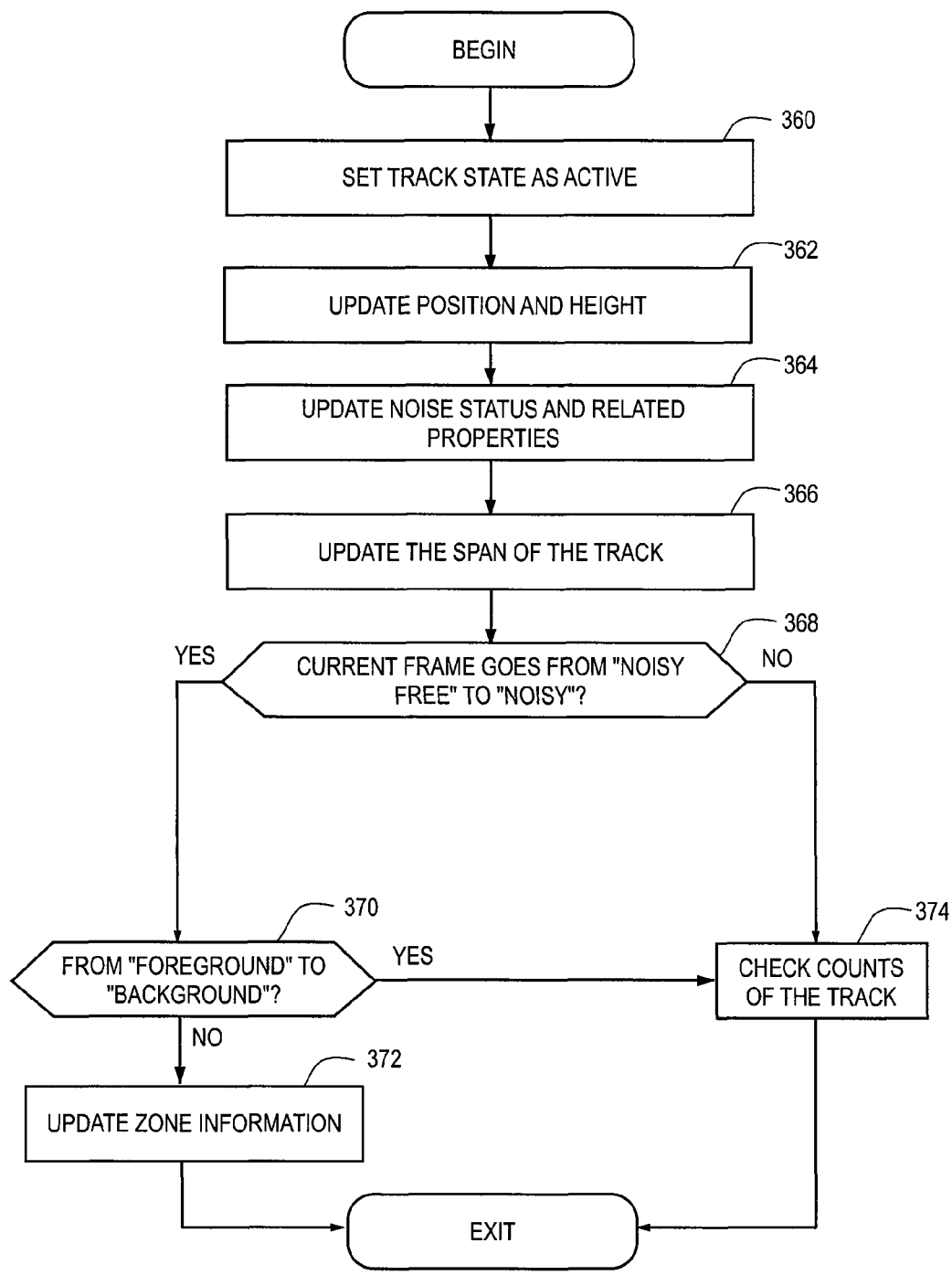
FIG. 12 is a flow diagram describing the flow of processes for track updates.

Referring to FIG. 12, each track 76 is updated with new information on its position, time, and height when there is a best matching human object detect 58 in the current height map 56 for the track 76. This operation updates the properties of the track 76 in the following steps.

First, set trk_state of the track 76 to 1 (block 360).

Second, for the current frame, obtain the height by using median filter on the most recent three heights of the track 76 and calculate the new position 56 by averaging on the most recent three positions of the track 76 (block 362).

Third, for the current frame, check the noise status using track predicate operator IsNoisyNow. If true, mark a specified number of frames in the past as noisy. In addition, update noise related properties of the track 76 (block 364).

Fourth, update the span of the track 76 (block 366).

Fifth, if one of the following conditions is met, collect the count carried by track 76 (block 374):
- (1) the track 76 is not noisy at the beginning, but it has been noisy for longer than the specified stationary track timeout (block 368); or
- (2) the track 76 is not in the background at the beginning, but it has been in the background for longer than the specified stationary track timeout (block 370).

Finally, update the current zone information (block 372).

2.2.4 Track Prediction Calculation

It helps to use a predicted position of the track 76 when looking for best matching detect 58. The predicted position is calculated by linear extrapolation on positions of the track 76 in the past three seconds.

2.2.5 Analysis and Processing of Old Track

This is the first phase of object tracking. Active tracks 88 are tracks 76 that are either created or extended with human object detects 58 in the previous frame. When there is no best matching human object detect 58 for the track 76, the track 76 is considered as inactive.

This phase mainly deals with tracks 76 that are inactive for a certain period of time or are marked for deletion in previous frame 56. Track analysis is performed on tracks 76 that have been inactive for a long time to decide whether to group them with existing tracks 74 or to mark them for deletion in the next frame 56. Tracks 76 are deleted if the tracks 76 have been marked for deletion in the previous frame 56, or the tracks 76 are inactive and were created a very short period of time before. If the counts of the soon-to-be deleted tracks 76 shall not be ignored according to the IsCountIgnored predicate operator, collect the counts of the tracks 76.

2.2.6 First Pass Matching Between Tracks and Detects

After all tracks 76 are analyzed for grouping or deletion, this phase searches for optimal matches between the human object detects 58 (i.e. the set of local maxima found in the object detection phase) and tracks 76 that have not been deleted.

First, check every possible pair of track 76 and detect 58 and put the pair into a candidate list if all of the following conditions are met:

(1) The track 76 is active, or it must be long enough (e.g. with more than three points), or it just became inactive a short period of time ago (e.g. it has less than three frames);

(2) The smaller of the distances from center of the detect 58 to the last two points of the track 76 is less than two thirds of the specified detection search range when the track 76 hasn't moved very far (e.g. the span of the track 76 is less than the specified minimum human head size and the track 76 has more than 3 points);

(3) If the detect 58 is in the background, the maximum height of the detect 58 must be greater than or equal to the specified minimum person height;

(4) If the detect 58 is neither in the background nor close to dead zones or height map boundaries, and the track 76 is neither in the background nor is noisy in the previous frame, and a first distance from the detect 58 to the predicted position of the track 76 is less than a second distance from the detect 58 to the end position of the track 76, use the first distance as the matching distance. Otherwise, use the second distance as the matching distance. The matching distance has to be less than the specified detection search range;

(5) The difference between the maximum height of the detect 58 and the height of last point of the track 76 must be less than the specified maximum height difference; and (6) If either the last point of track 76 or the detect 58 is in the background, or the detect 58 is close to dead zones or height map boundaries, the distance from the track 76 to the detect 58 must be less than the specified background detection search range, which is generally smaller than the threshold used in condition (4).

Sort the candidate list in terms of the distance from the detect 58 to the track 76 or the height difference between the detect 58 and the track 76 (if the distance is the same) in ascending order.

The sorted list contains pairs of detects 58 and tracks 76 that are not paired. Run through the whole sorted list from the beginning and check each pair. If either the detect 58 or the track 76 of the pair is marked "paired" already, ignore the pair. Otherwise, mark the detect 58 and the track 76 of the pair as "paired".

2.2.7 Search of Suboptimal Location For Unpaired Tracks

Due to sparseness nature of the disparity map 50 and the height map 56, some human objects may not generate local maxima in the height map 56 and therefore may be missed in the object detection process 108. In addition, the desired local maxima might get suppressed by a neighboring higher local maximum from a taller object. Thus, some human object tracks 76 may not always have a corresponding local maximum in the height map 56. This phase tries to resolve this issue by searching for a suboptimal location for a track 76 that has no corresponding local maximum in the height map 56 at the current time. Tracks 76 that have already been paired with a detect 58 in the previous phase might go through this phase too to adjust their locations if the distance between from end of those tracks to their paired detects is much larger than their steps in the past. In the following description, the track 76 currently undergoing this phase is called Track A. The search is performed in the following steps.

Figure 7:
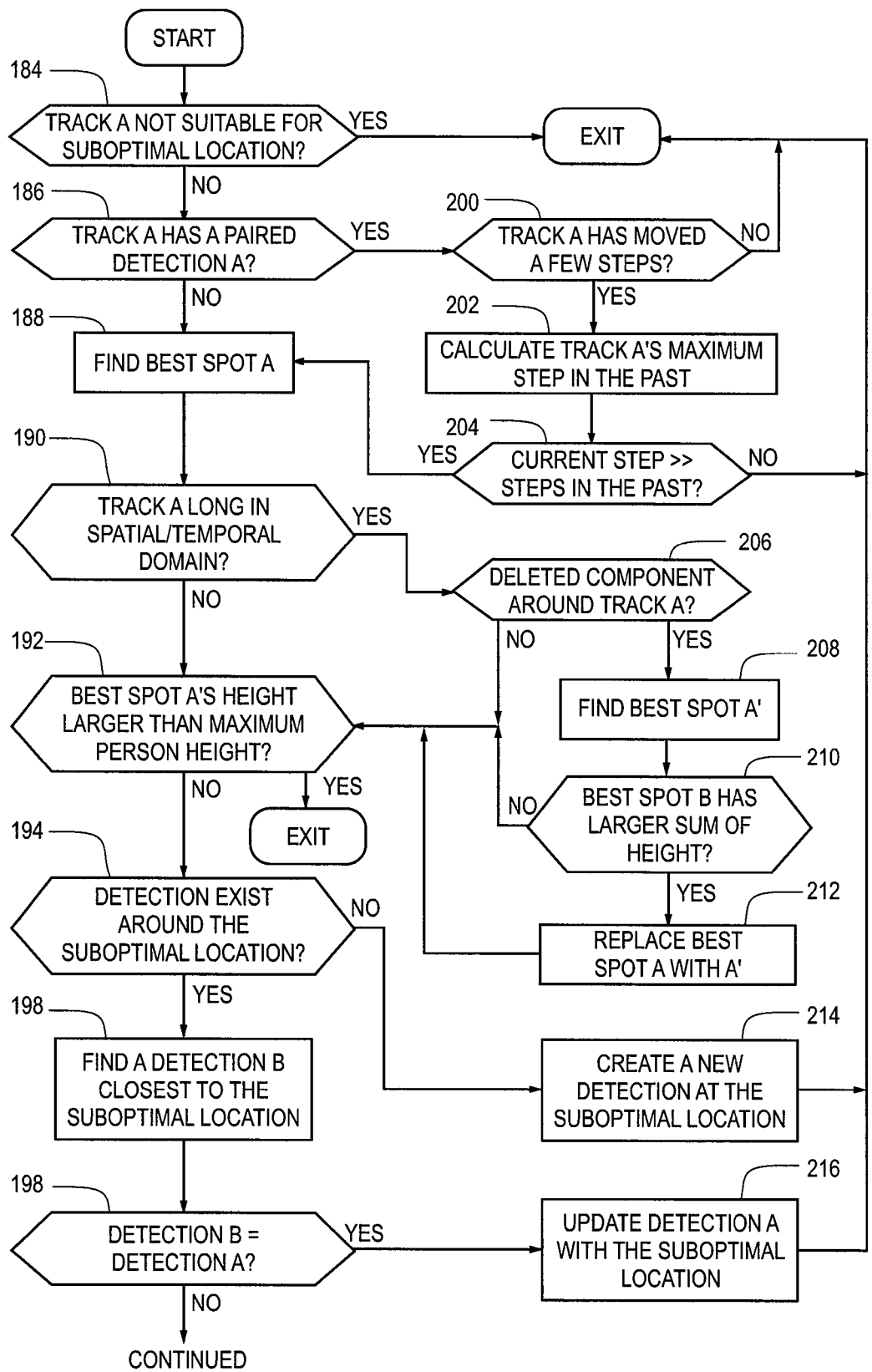
FIG. 7 is a first part of a flow diagram describing the flow of processes for suboptimal localization of unpaired tracks.

First, referring to FIG. 7, if Track A is deemed not suitable for the suboptimal location search operation (i.e., it is inactive, or it's in the background, or it's close to the boundary of the height map 56 or dead zones, or its height in last frame was less than the minimum person height (block 184)), stop the search process and exit. Otherwise, proceed to the next step.

Second, if Track A has moved a few steps (block 200) (e.g., three steps) and is paired with a detection (called Detection A) (block 186) that is not in the background and whose current step is much larger than its maximum moving step within a period of time in the past specified by a track time out parameter (block 202, 204), proceed to the next step. Otherwise, stop the search process and exit.

Third, search around the end point of Track A in a range defined by its maximum moving steps for a location with the largest height sum in a predefined window and call this location Best Spot A (block 188). If there are some detects 58 deleted in the process of merging of closely located detects in the object detection phase and Track A is long in either the spatial domain or the temporal domain (e.g. the span of Track A is greater than the specified noisy track span threshold, or Track A has more than three frames) (block 190), find the closest one to the end point of Track A too. If its distance to the end point of Track A is less than the specified detection search range (block 206), search around the deleted component for the position with the largest height sum and call it Best Spot A' (block 208). If neither Best Spot A nor Best Spot A' exists, stop the search process and exit. If both Best Spot A and Best Spot A' exist, choose the one with larger height sum. The best spot selected is called suboptimal location for Track A. If the maximum height at the suboptimal location is greater than the predefined maximum person height (block 192), stop the search and exit. If there is no current detection around the suboptimal location (block 194), create a new detect 58 (block 214) at the suboptimal location and stop the search. Otherwise, find the closest detect 58 to the suboptimal location and call it Detection B (block 196). If Detection B is the same detection as Detection A in step 2 (block 198), update Detection A's position with the suboptimal location (block 216) and exit the search. Otherwise, proceed to the next step.

Figure 8:
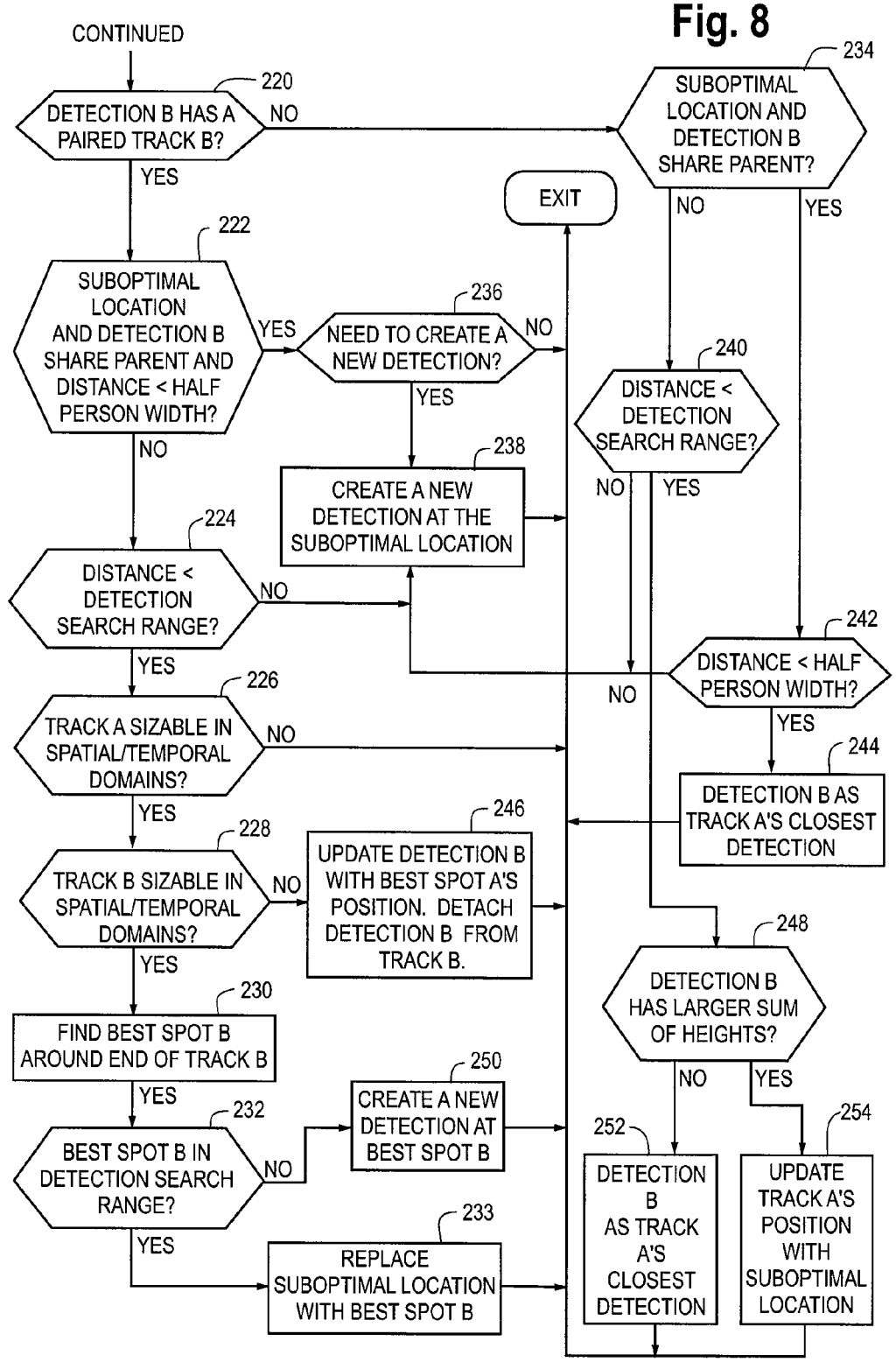
FIG. 8 is a second part of the flow diagram of FIG. 7 describing the flow of processes for suboptimal localization of unpaired tracks.

Fourth, referring to FIG. 8, if Detection B is not already paired with a track 76 (block 220), proceed to the next step. Otherwise, call the paired track of the Detection B as Track B and perform one of the following operations in the given order before exiting the search:

(1) When the suboptimal location for Track A and Detection B are from the same parent component (e.g. in the support of the same first pass component) and the distance between Track A and Detection B is less than half of the specified maximum person width, create a new detect 58 at the suboptimal location (block 238) if all of the following three conditions are met: (i) the difference between the maximum heights at the suboptimal location and Detection B is less than a specified person height error range; (ii) the difference between the height sums at the two locations is less than half of the greater one; (iii) the distance between them is greater than the specified detection search range and the trk_range values of both Track A and Track B are greater than the specified noisy track offset. Otherwise, ignore the suboptimal location and exit;

(2) If the distance between the suboptimal location and Detection B is greater than the specified detection search range, create a new detect 58 at the suboptimal location and exit;

(3) If Track A is not sizable in both temporal and spatial domains (block 226), ignore the suboptimal location;

(4) If Track B is not sizable in both temporal and spatial domain (block 228), detach Track B from Detection B and update Detection B's position with the suboptimal location (block 246). Mark Detection B as Track A's closest detection;

(5) Look for best spot for Track B around its end position (block 230). If the distance between the best spot for Track B and the suboptimal location is less than the specified detection search range (block 232) and the best spot for Track B has a larger height sum, replace the suboptimal location with the best spot for Track B (block 233). If the distance between is larger than the specified detection search range, create a detect 58 at the best spot for Track B (block 250). Update Detection A's location with the suboptimal location if Detection A exists.

Fifth, if the suboptimal location and Detection B are not in the support of the same first pass component, proceed to the next step. Otherwise create a new detection at the suboptimal location if their distance is larger than half of the specified maximum person width, or ignore the suboptimal location and mark Detection B as Track A's closest detection otherwise.

Finally, create a new detect 58 at suboptimal location and mark Detection B as Track A's closest detection (block 252) if their distance is larger than the specified detection search range. Otherwise, update Track A's end position with the suboptimal location (block 254) if the height sum at the suboptimal location is greater than the height sum at Detection B, or mark Detection B as Track A's closest detection otherwise.

2.2.8 Second Pass Matching Between Tracks and Detects

After the previous phase, a few new detections may be added and some paired detects 72 and tracks 76 become unpaired again. This phase looks for the optimal match between current unpaired detects 72 and tracks 76 as in the following steps.

Figure 9:
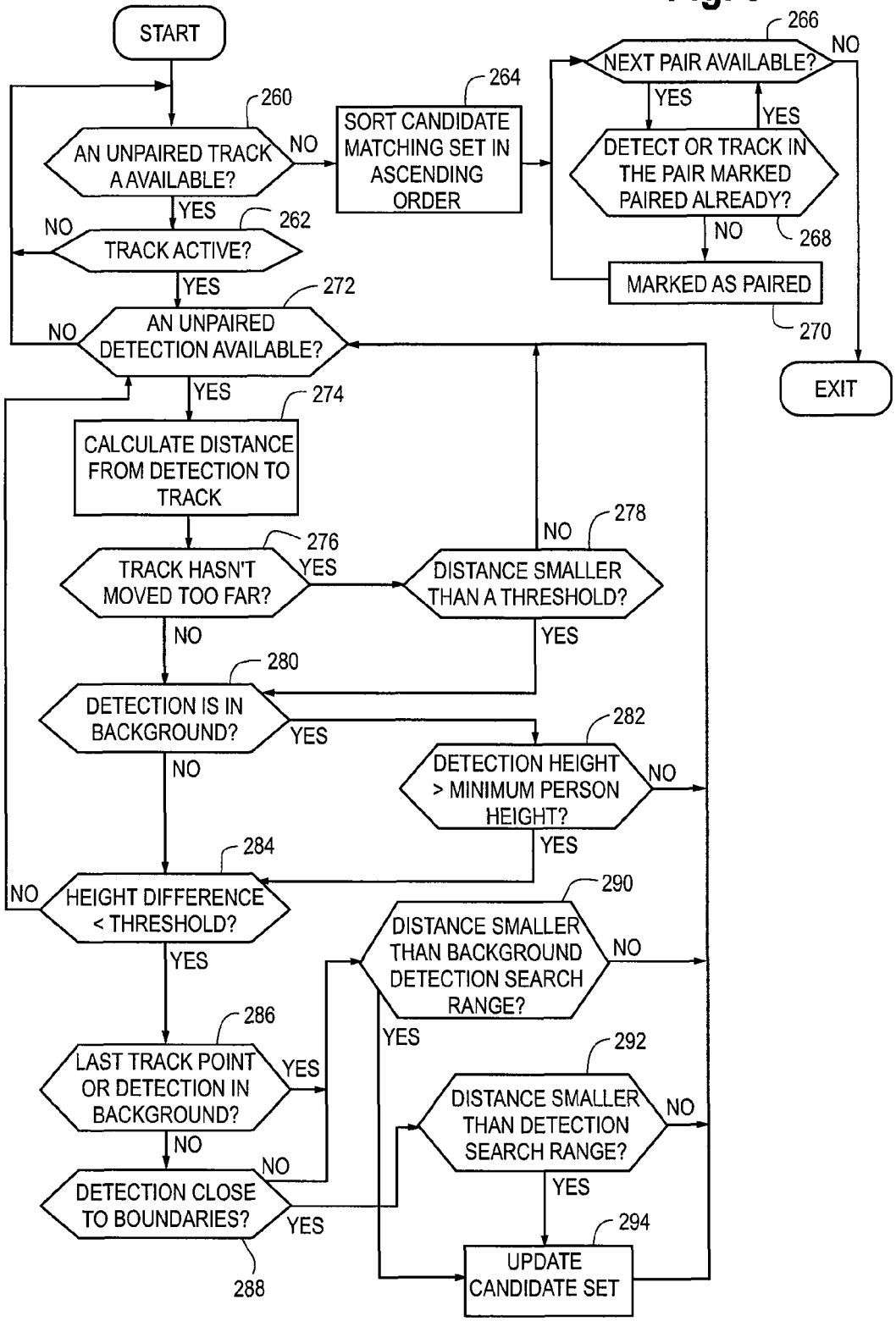
FIG. 9 is a flow diagram describing the flow of processes for second pass matching of tracks and object detects.

For every pair of track 76 and detect 58 that remain unpaired, put the pair into a candidate list if all of the following five conditions are met:

(1) the track 76 is active (block 262 in FIG. 9);
(2) the distance from detect 58 to the end point of the track 76 (block 274) is smaller than two thirds of the specified detection search range (block 278) when the track doesn't move too far (e.g. the span of the track 76 is less than the minimal head size and the track 76 has more than three points (block 276));
(3) if the detect 58 is in the background (block 280), the maximum height of the detect 58 must be larger than or equal to the specified minimum person height (block 282);
(4) the difference between the maximum height and the height of the last point of the track 76 is less than the specified maximum height difference (block 284);
(5) the distance from the detect 58 to the track 76 must be smaller than the specified background detection search range, if either the last point of the track 76 or the detect 58 is in background (block 286), or the detect 58 is close to dead zones or height map boundaries (block 288); or if not, the distance from the detect 58 to the track 76 must be smaller than the specified detection search range (block 292).

Sort the candidate list in terms of the distance from the detect 58 to the track 76 or the height difference between the two (if distance is the same) in ascending order (block 264).

The sorted list contains pairs of detects 58 and tracks 76 which are not paired at all at the beginning. Then run through the whole sorted list from the beginning and check each pair. If either the detect 58 or the track 76 of the pair is marked "paired" already, ignore the pair. Otherwise, mark the detect 58 and the track 76 of the pair as "paired" (block 270).

2.2.9 Track Update or Creation

Figure 10:
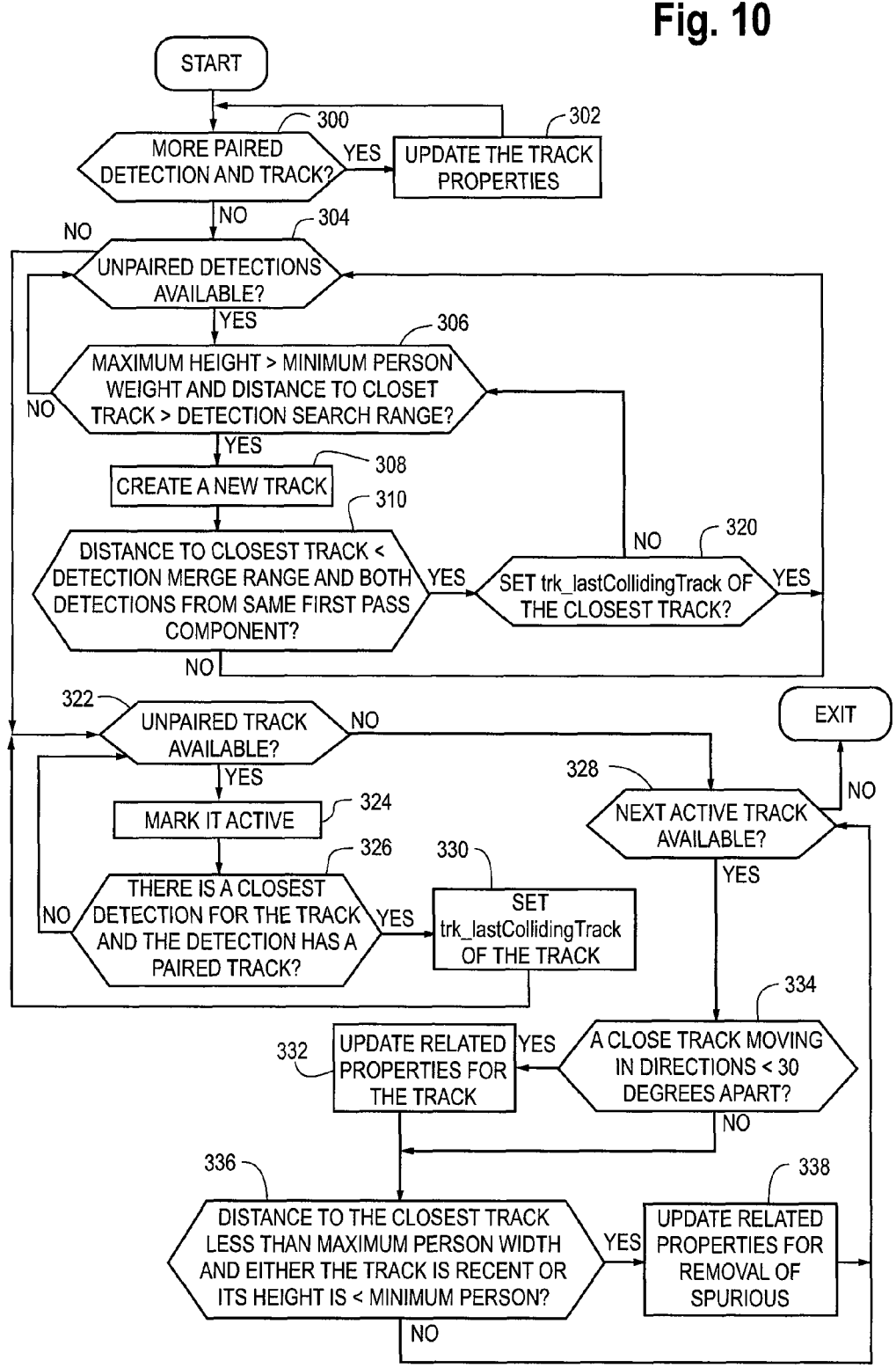
FIG. 10 is a flow diagram describing the flow of processes for track updating or creation.

After the second pass of matching, the following steps are performed to update old tracks or to create new tracks:

First, referring to FIG. 10, for each paired set of track 76 and detect 58 the track 76 is updated with the information of the detect 58 (block 300,302).

Second, create a new track 80 for every detect 58 that is not matched to the track 76 if the maximum height of the detect 58 is greater than the specified minimum person height, and the distance between the detect 58 and the closest track 76 of the detect 58 is greater than the specified detection search range (block 306, 308). When the distance is less than the specified detection merge range and the detect 58 and the closest track 76 are in the support of the same first pass component (i.e., the detect 58 and the track 76 come from the same first pass component), set the trk_lastCollidingTrack of the closest track 76 to the ID of the newly created track 80 if there is one (block 310, 320).

Third, mark each unpaired track 77 as inactive (block 324). If that track 77 has a marked closest detect and the detect 58 has a paired track 76, set the trk_lastCollidingTrack property of the current track 77 to the track ID of the paired track 76 (block 330).

Fourth, for each active track 88, search for the closest track 89 moving in directions that are at most thirty degrees from the direction of the active track 88. If the closest track 89 exists, the track 88 is considered as closely followed by another track, and "Shopping Cart Test" related properties of the track 88 are updated to prepare for "Shopping Cart Test" when the track 88 is going to be deleted later (block 334).

Finally, for each active track 88, search for the closest track 89. If the distance between the two is less than the specified maximum person width and either the track 88 has a marked closest detect or its height is less than the specified minimum person height, the track 88 is considered as a less reliable false track. Update "False Track" related properties to prepare for the "False Track" test later when the track 88 is going to be deleted later (block 338).

As a result, all of the existing tracks 74 are either extended or marked as inactive, and new tracks 80 are created.

2.2.10 Track Analysis

Track analysis is applied whenever the track 76 is going to be deleted. The track 76 will be deleted when it is not paired with any detect for a specified time period. This could happen when a human object moves out of the field view 44, or when the track 76 is disrupted due to poor disparity map reconstruction conditions such as very low contrast between the human object and the background.

Figure 6:
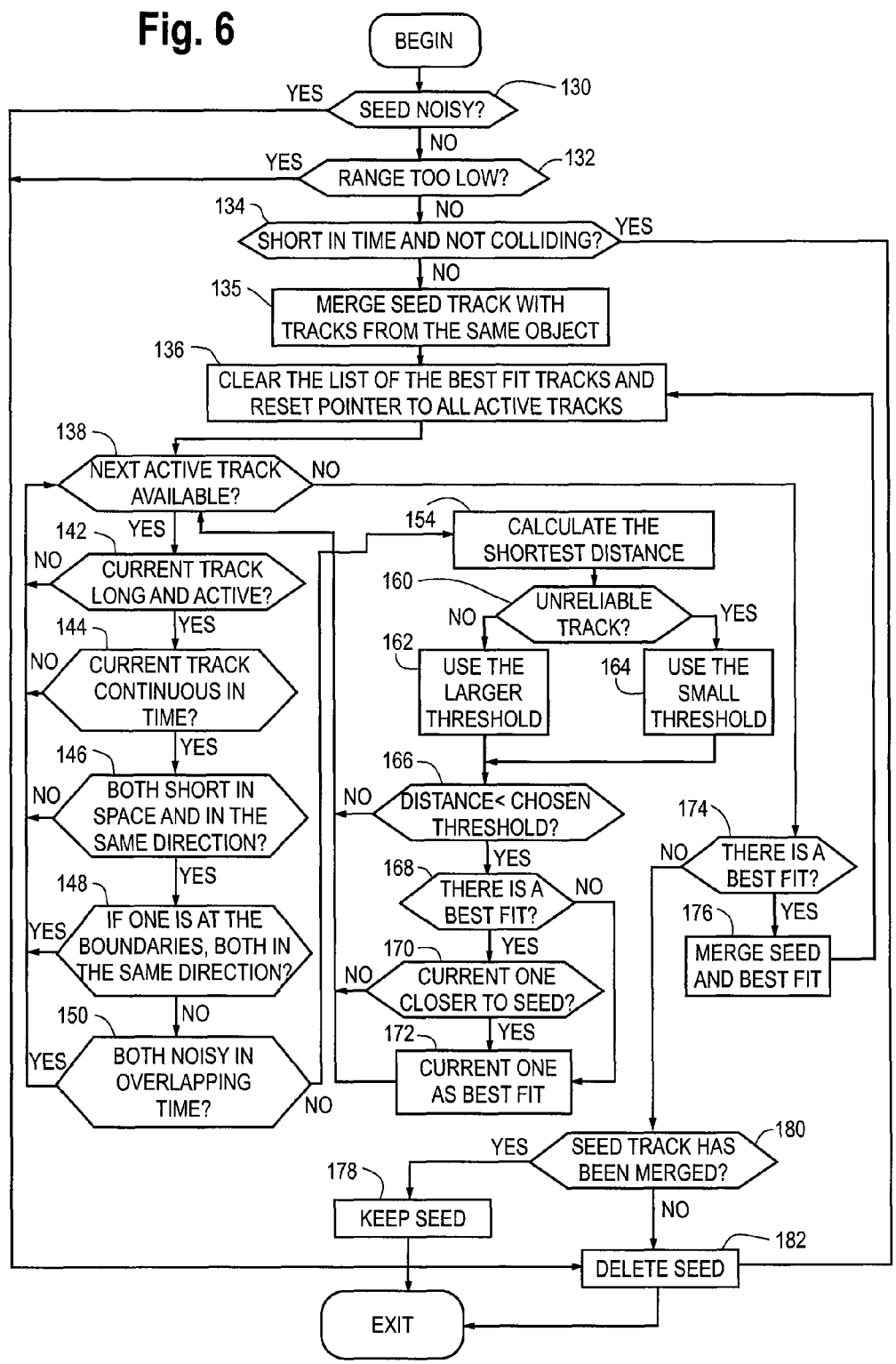
FIG. 6 is a flow diagram describing the flow of processes for track analysis.

The goal of track analysis is to find those tracks that are likely continuations of some soon-to-be deleted tracks, and merge them. Track analysis starts from the oldest track and may be applied recursively on newly merged tracks until no tracks can be further merged. In the following description, the track that is going to be deleted is called a seed track, while other tracks are referred to as current tracks. The steps of track analysis are as followings:

First, if the seed track was noisy when it was active (block 130 in FIG. 6), or its trk_range is less than a specified merging track span (block 132), or its trk_lastCollidingTrack does not contain a valid track ID and it was created in less than a specified merging track time period before (block 134), stop and exit the track analysis process.

Second, examine each active track that was created before the specified merging track time period and merge an active track with the seed track if the "Is the Same Track" predicate operation on the active track (block 140) returns true.

Third, if the current track satisfies all of the following three initial testing conditions, proceed to the next step. Otherwise, if there exists a best fit track (definition and search criteria for the best fit track will be described in forthcoming steps), merge the best fit track with the seed track (block 172, 176). If there is no best fit track, keep the seed track if the seed track has been merged with at least one track in this operation (block 178), or delete the seed track (block 182) otherwise. Then, exit the track analysis.

The initial testing conditions used in this step are: (1) the current track is not marked for deletion and is active long enough (e.g. more than three frames) (block 142); (2) the current track is continuous with the seed track (e.g. it is created within a specified maximum track timeout of the end point of the seed track) (block 144); (3) if both tracks are short in space (e.g., the trk_ranges properties of both tracks are less than the noisy track length threshold), then both tracks should move in the same direction according to the relative offset of the trk_start and trk_end properties of each track (block 146).

Fourth, merge the seed track and the current track (block 152). Return to the last step if the current track has collided with the seed track (i.e., the trk_lastCollidingTrack of the current track is the trk_ID of the seed track). Otherwise, proceed to the next step.

Fifth, proceed to the next step if the following two conditions are met at the same time, otherwise return to step 3: (1) if either track is at the boundaries according to the "is at the boundary" checking (block 148), both tracks should move in the same direction; and (2) at least one track is not noisy at the time of merging (block 150). The noisy condition is determined by the "is noisy" predicate operator.

Sixth, one of two thresholds coming up is used in distance checking. A first threshold (block 162) is specified for normal and clean tracks, and a second threshold is specified for noisy tracks or tracks in the background. The second threshold (block 164) is used if either the seed track or the current track is unreliable (e.g. at the boundaries, or either track is noisy, or trk_ranges of both tracks are less than the specified noisy track length threshold and at least one track is in the background) (block 160), otherwise the first threshold is used. If the shortest distance between the two tracks during their overlapping time is less than the threshold (block 166), mark the current track as the best fit track for the seed track (block 172) and if the seed track does not have best fit track yet or the current track is closer to the seed track than the existing best fit track (block 170). Go to step 3.

2.2.11 Merging of Tracks

Figure 11:
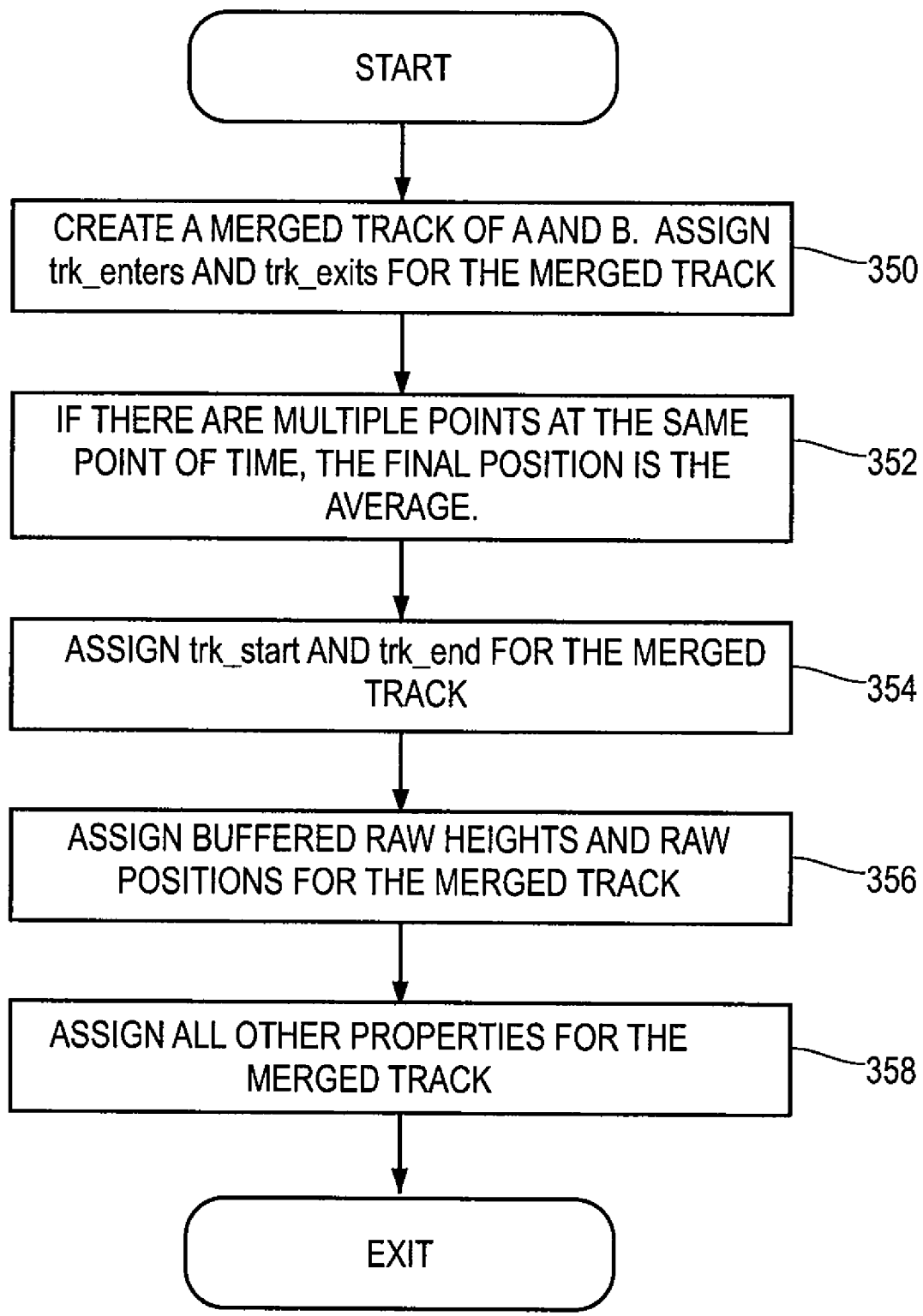
FIG. 11 is a flow diagram describing the flow of processes for track merging.

This operation merges two tracks into one track and assigns the merged track with properties derived from the two tracks. Most properties of the merged track are the sum of the corresponding properties of the two tracks but with the following exceptions:

Referring to FIG. 11, trk_enters and trk_exits properties of the merged track are the sum of the corresponding properties of the tracks plus the counts caused by zone crossing from the end point of one track to the start point of another track, which compensates the missing zone crossing in the time gap between the two tracks (block 350).

If a point in time has multiple positions after the merge, the final position is the average (block 352).

The trk_start property of the merged track has the same trk_start value as the newer track among the two tracks being merged, and the trk_end property of the merged track has the same trk_end value as the older track among the two (block 354).

The buffered raw heights and raw positions of the merged track are the buffered raw heights and raw positions of the older track among the two tracks being merged (block 356).

The invention is not limited by the embodiments disclosed herein and it will be appreciated that numerous modifications and embodiments may be devised by those skilled in the art. Therefore, it is intended that the following claims cover all such embodiments and modifications that fall within the true spirit and scope of the present invention.

REFERENCES

[1] C. Wren, A. Azarbayejani, T. Darrel and A. Pentland. Pfinder: Real-time tracking of the human body. In *IEEE Transactions on Pattern Analysis and Machine Intelligence*, July 1997, Vol 19, No. 7, Page 780-785.

[2] I. Haritaoglu, D. Harwood and L. Davis. W4: Who? When? Where? What? A real time system for detecting and tracking people. *Proceedings of the Third IEEE International Conference on Automatic Face and Gesture Recognition*, Nara, Japan, April 1998.

[3] M. Isard and A. Blake, Contour tracking by stochastic propagation of conditional density. *Proc ECCV* 1996.

[4] P. Remagnino, P. Brand and R. Mohr, Correlation techniques in adaptive template matching with uncalibrated cameras. *In Vision Geometry III, SPIE Proceedings* vol. 2356, Boston, Mass., 2-3 Nov. 1994

[5] C. Eveland, K. Konolige, R. C. Bolles, Background modeling for segmentation of video-rate stereo sequence. In *Proceedings of the IEEE Conference on Computer Vision and Pattern Recognition*, page 226, 1998.

[6] J. Krumm and S. Harris, System and process for identifying and locating people or objects in scene by selectively slustering three-dimensional region. U.S. Pat. No. 6,771, 818 B1, August 2004.

[7] T. Darrel, G. Gordon, M. Harville and J. Woodfill, Integrated person tracking using stereo, color, and pattern detection. In *Proceedings of the IEEE Conference on Computer Vision and Pattern Recognition*, page 601-609, Santa Barbara, June 1998.

What is claimed is:

1. A method of identifying, tracking, and counting objects of interest based upon at least one pair of stereo image frames taken by at least one image capturing device, comprising the steps of:

obtaining said at least one pair of stereo image frames and converting each said stereo image frame to a rectified image frame using calibration data obtained from said at least one image capturing device;

generating a disparity map based upon said rectified image frame;

generating a depth map based upon said disparity map and said calibration data;

identifying the presence or absence of said objects of interest from said depth map and comparing each of said objects of interest to existing tracks comprising previously identified objects of interest;

for each said presence of an object of interest, adding said object of interest to one of said existing tracks if said object of interest matches said one existing track, or creating a new track comprising said object of interest if said object of interest does not match any of said existing tracks;

updating each said existing track; and maintaining a count of said objects of interest in a given time period based upon said existing tracks created or modified during said given time period, wherein,
each said track comprises attributes corresponding to the position and height of the object of interest comprised in said track, a timestamp, a track identifier, and a set of additional track attributes which comprises a noise operator to determine whether said track bounces back and forth to a certain extent in a predetermined minimum noisy track duration.

2. The method of claim 1 wherein said calibration data comprises parameters of said image capturing device, such parameters including at least one of optical center, radio distortion, lens distortion, focal lengths, and relative sensor position.

3. The method of claim 1 wherein said pair of stereo image frames comprises a first image taken by a first sensor at said image capturing device, and a second image taken by a second sensor at said image capturing device at the same time said first image is taken by said first sensor.

4. The method of claim 3 wherein said rectified image frame comprises a first rectified image converted from said first image and a second rectified image converted from said second image.

5. The method of claim 1 wherein the step of identifying object of interest comprises the additional steps of:
a first component detection step wherein connected areas in said depth image satisfying a predefined connectivity property are labeled as components;
a second object detection step wherein local maxima detections are computed for each said component;
merging said local maxima detections closer than a specified merging distance to each other; and
labeling all remaining local maxima detections as candidate detects.

6. The method of claim 5 wherein said first component detection step includes calculating properties of said components and applying predicate operators for said components.

7. The method of claim 6 wherein said predicate operators include a noise operator to check whether size of said first component is beneath a predetermined threshold, and a boundary operator to check whether said component is at boundaries of said height map.

8. The method of claim 7 wherein applying predicate operators for said components includes eliminating those first components whose noise operators indicate a noisy state.

9. The method of claim 5 wherein merging said local maxima detections includes eliminating those local maxima detections in background.

10. The method of claim 5 wherein merging said local maxima detections includes eliminating those local maxima detections whose boundary operators indicate a state of being at the boundary or in a dead zone.

11. The method of claim 5 wherein merging said local maxima detections includes eliminating the local maxima detection with less volume if the height difference in two local maxima detections is less than a predefined length threshold.

12. The method of claim 11 wherein merging said local maxima detections includes eliminating the local maxima detection with less height if the height difference in two local maxima detections is larger than or equal to said predefined length threshold and the height of the local maxima detection with the higher height is less than a predetermined maximum height threshold.

13. The method of claim 12 wherein merging said local maxima detections includes eliminating the local maxima detection with greater height if said height difference of two local maxima detections is larger than or equal to said predefined length threshold and said height of the local maxima detection with the higher height is greater than said predetermined maximum height threshold.

14. The method of claim 5 wherein merging said local maxima detections includes eliminating the local maxima detection whose area is less than a predetermined portion of the other local maxima detection.

15. The method of claim 1 wherein said set of additional track attributes comprises a status attribute for each said track taking one value from three possible values: active, inactive, or deleted, wherein said status attribute is set to be active if said track comprises the object of interest in the most recent height map, inactive if said track does not comprise any object of interest in the most recent height map, and deleted if said track is marked for deletion.

16. The method of claim 1 wherein said set of additional track attributes comprises a start point, an end point, a height, and a position for said track.

17. The method of claim 1 wherein updating said existing track includes the additional steps of:
set the status attribute of said existing track;
update the height and the position attributes of said existing track;
check the noise operator for said existing track and update related attributes of said existing track;
update a span attribute of said existing track;
collect a count carried by said existing track if said existing track becomes noisy or has been in background; and
update zone information.

18. The method of claim 1 wherein the matching between said existing tracks and said objects of interest include the additional steps of:
analyzing said existing tracks;
first pass matching between said existing tracks and said object of interest;
searching for suboptimal locations for unpaired tracks;
second pass matching between said existing tracks and said object of interest; and
updating said existing tracks and creating new tracks.

19. At least one non-transitory computer readable medium encoded with computer-executable instructions that, when executed on a computer system, perform a method for identifying, tracking, and counting objects of interest based upon at least one pair of stereo image frames taken by at least one image capturing device, the method comprising the steps of:
generating depth maps based upon said at least one pair of stereo image frames and calibration data obtained from said at least one image capturing device;
identifying the presence or absence of said objects of interest from said depth maps and comparing each of said objects of interest to existing tracks comprising previously identified objects of interest;
for each said presence of an object of interest, adding said object of interest to one of said existing tracks if said object of interest matches said one existing track, or creating new track comprising said object of interest if said object of interest does not match any of said existing tracks;
updating each said existing track; and
maintaining a count of said objects of interest in a given time period based upon said existing tracks created or modified during said given time period,
wherein,
each said track comprises attributes corresponding to the position and height of the object of interest comprised in said track, a timestamp, a track identifier, and a set of additional track attributes which comprises a noise operator to determine whether said track bounces back and forth to a certain extent in a predetermined minimum noisy track duration.

20. The at least one non-transitory computer-readable medium of claim 19 wherein said depth map comprises a time attribute and pixels, wherein each of said pixels includes a depth attribute.

21. The at least one non-transitory computer-readable medium of claim 19 wherein said calibration data comprises parameters of said image capturing device, such parameters including at least one of optical center, lens distortion, focal length, and relative sensor position.

22. The at least one non-transitory computer-readable medium of claim 19 wherein identifying human object of interest comprises the additional steps of:
a first component detection step wherein connected areas in said depth image satisfying a predefined connectivity property are labeled as components;
a second object detection step wherein local maxima detections are computed for each said component;
merging said local maxima detections closer than a specified merging distance to each other; and
labeling all remaining local maxima detections as candidate detects.

23. The at least one non-transitory computer-readable medium of claim 22 wherein said first component detection step includes calculating properties of said components and applying predicate operators for said components.

24. The at least one non-transitory computer-readable medium of claim 23 wherein said predicate operators include a noise operator to check whether size of said first component is beneath a predetermined threshold, and a boundary operator to check whether said component is at boundaries of said height map.

25. The at least one non-transitory computer-readable medium of claim 24 wherein said first component detection step further includes eliminating those first components whose noise operators indicate a noisy state.

26. The at least one non-transitory computer-readable medium of claim 22 wherein merging said local maxima detections includes eliminating those local maxima detections in background.

27. The at least one non-transitory computer-readable medium of claim 22 wherein merging said local maxima detections includes eliminating those local maxima detections whose boundary operators indicate a state of being at the boundary of said height map or in dead zones.

28. The at least one non-transitory computer-readable medium of claim 22 wherein merging said local maxima detections includes eliminating the local maxima detection with less volume if the height difference in two local maxima detections is less than a predefined length threshold.

29. The at least one non-transitory computer-readable medium of claim 22 wherein merging said local maxima detections includes eliminating the local maxima detection with less height if the height difference in two local maxima detections is larger than or equal to said predefined length threshold and the height of the local maxima detection with the higher height is less than a predetermined maximum height threshold.

30. The at least one non-transitory computer-readable medium of claim 22 wherein merging said local maxima detections includes eliminating the local maxima detection with greater height if said height difference in two local maxima detections is larger than or equal to said predefined length threshold and said height of the local maxima detection with the higher height is greater than said predetermined maximum height threshold.

31. The at least one non-transitory computer-readable medium of claim 22 wherein merging said local maxima detections includes eliminating the local maxima detection whose area is less than a predetermined portion of the other local maxima detection.

32. The at least one non-transitory computer-readable medium of claim 19 wherein said set of additional track attributes comprises a status attribute for each said track taking one value from three possible values: active, inactive, or deleted, wherein said status attribute is set to be active if said track comprises the object of interest in the most recent height map, inactive if said track does not comprise any object of interest in the most recent height map, and deleted if said track is marked for deletion.

33. The at least one non-transitory computer-readable medium of claim 32 wherein said set of additional track attributes comprises a start point, an end point, a height, and a position for said track.

34. The at least one non-transitory computer-readable medium of claim 19 wherein updating said existing track includes the additional steps of:
set the status attribute of said existing track;
update the height and the position attributes of said existing track;
check the noise operator for said existing track and update related attributes of said existing track;
update a span attribute of said existing track;
collect a count carried by said existing track if said existing track becomes noisy or has been in background longer than a given period of time; and
update zone information.

35. The at least one non-transitory computer-readable medium of claim 19 wherein the matching between said existing tracks and said objects of interest include the additional steps of:
analyzing said existing tracks;
first pass matching between said existing tracks and said object of interest;
searching for suboptimal locations for unpaired tracks;
second pass matching between said existing tracks and said object of interest; and
updating said existing tracks and creating new tracks.

36. An object identifying, tracking, and counting system based upon image frames taken at a facility, the system comprising:
at least one image capturing device comprising video sensors adapted to obtain said image frames from said facility;
a boot loader module adapted to load programs into memory of said system and execute said programs in said system;
a counting module adapted to compute height maps, object detections, object tracks, and object counts based upon said image frames; and
a system management and communication module adapted to provide communication functions, such as storing data to a database at a remote site, making video recordings, and sending emails,
wherein,
the counting module is adapted to:
obtain at least one pair of said image frames from said at least one image capturing device and convert each said image frame to a rectified image frame using calibration data of said at least one image capturing device, generate a depth map based upon said rectified image frames and said calibration data, identify the presence or absence of objects of interest from said depth map, compare each of said objects of interest to existing tracks comprising previously identified objects of interest, for each said presence of an object of interest, add said object of interest to one of said existing tracks if said object of interest matches said one existing track, or create a new track comprising said object of interest if said object of interest does not match any of said existing tracks, update each said existing track, maintain a count of said objects of interest in a given time period based upon said existing tracks created or modified during said given time period, and each said track comprises attributes corresponding to the position and height of the object of interest comprised in said track, a timestamp, a track identifier, and a set of additional track attributes which comprises a noise operator to determine whether said track bounces back and forth to a certain extent in a predetermined minimum noisy track duration.

37. The object identifying, tracking, and counting system of claim 36, wherein said calibration data comprises parameters of said image capturing device, such parameters including at least one of optical center, radio distortion, lens distortion, focal lengths, and relative sensor position.

38. The object identifying, tracking, and counting system of claim 36, wherein said pair of image frames comprises a first image taken by a first sensor of said video sensors at said image capturing device, and a second image taken by a second sensor of said video sensors at said image capturing device at the same time said first image is taken by said first sensor.

39. The object identifying, tracking, and counting system of claim 38, wherein said rectified image frame comprises a first rectified image converted from said first image and a second rectified image converted from said second image.

40. The object identifying, tracking, and counting system of claim 36, wherein the counting module is further adapted to:

label connected areas in said depth image satisfying a predefined connectivity property as components;

compute local maxima detections for each said component;

merge said local maxima detections closer than a specified merging distance to each other; and label all remaining local maxima detections as candidate detects.

41. The object identifying, tracking, and counting system of claim 36 wherein the counting module is further adapted to analyze said existing tracks;

match between said existing tracks and said object of interest;

search for suboptimal locations for unpaired tracks;

update said existing tracks;

create new tracks; and collect a count carried by said existing track.

* * * * *